Jan. 12, 1937.   B. L. GREEN   2,067,185
MEANS FOR PREPARING CONTROL SHEETS FOR LINOTYPE MACHINES AND THE LIKE
Original Filed June 23, 1931   13 Sheets-Sheet 1

INVENTOR.
BUFORD L. GREEN
BY
ATTORNEY.

Jan. 12, 1937.  B. L. GREEN  2,067,185
MEANS FOR PREPARING CONTROL SHEETS FOR LINOTYPE MACHINES AND THE LIKE
Original Filed June 23, 1931    13 Sheets-Sheet 4
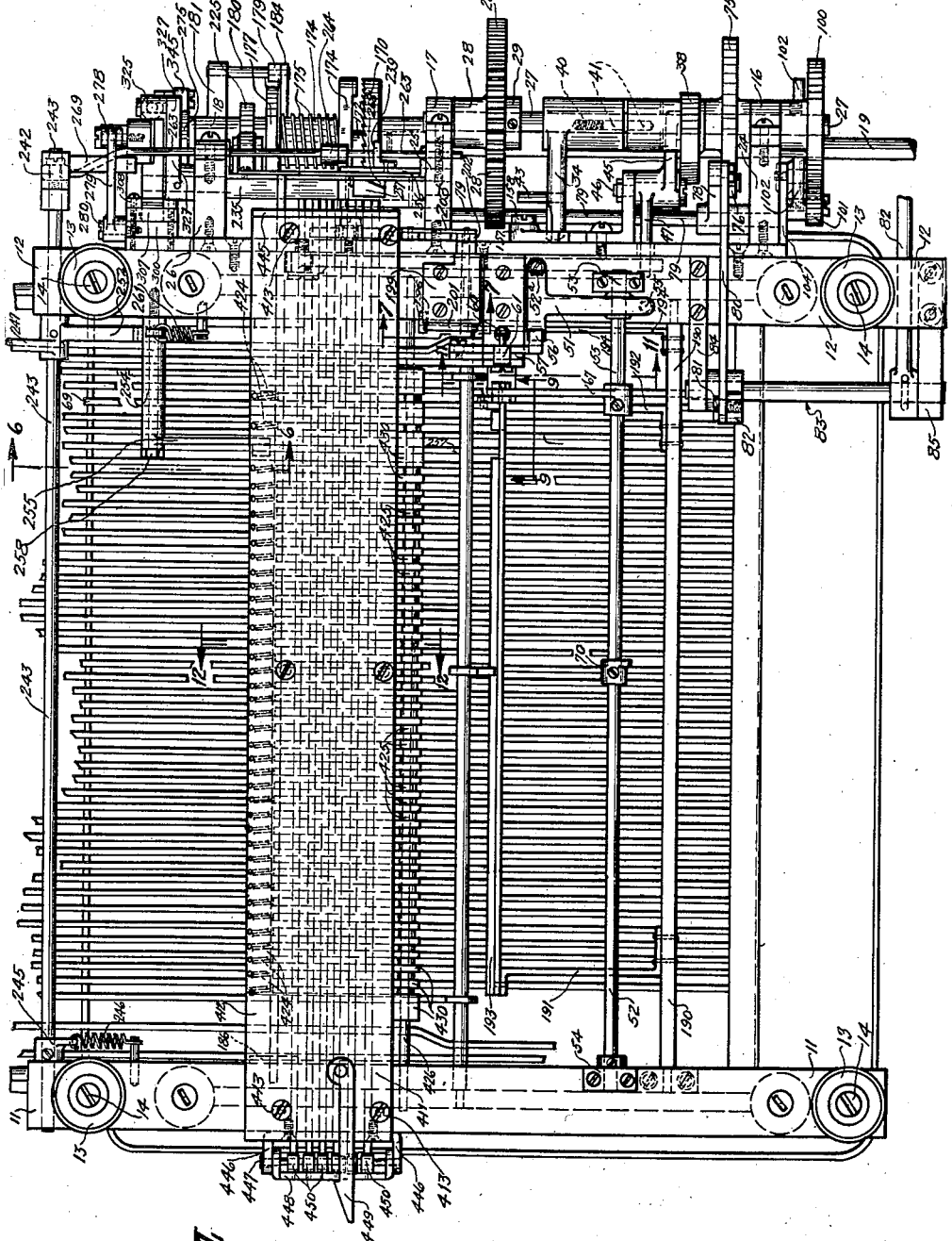
Fig. 4
INVENTOR:
BUFORD L. GREEN
BY 
ATTORNEY.

Jan. 12, 1937. B. L. GREEN 2,067,185
MEANS FOR PREPARING CONTROL SHEETS FOR LINOTYPE MACHINES AND THE LIKE
Original Filed June 23, 1931 13 Sheets-Sheet 5

INVENTOR:
BUFORD L. GREEN
BY
ATTORNEY.

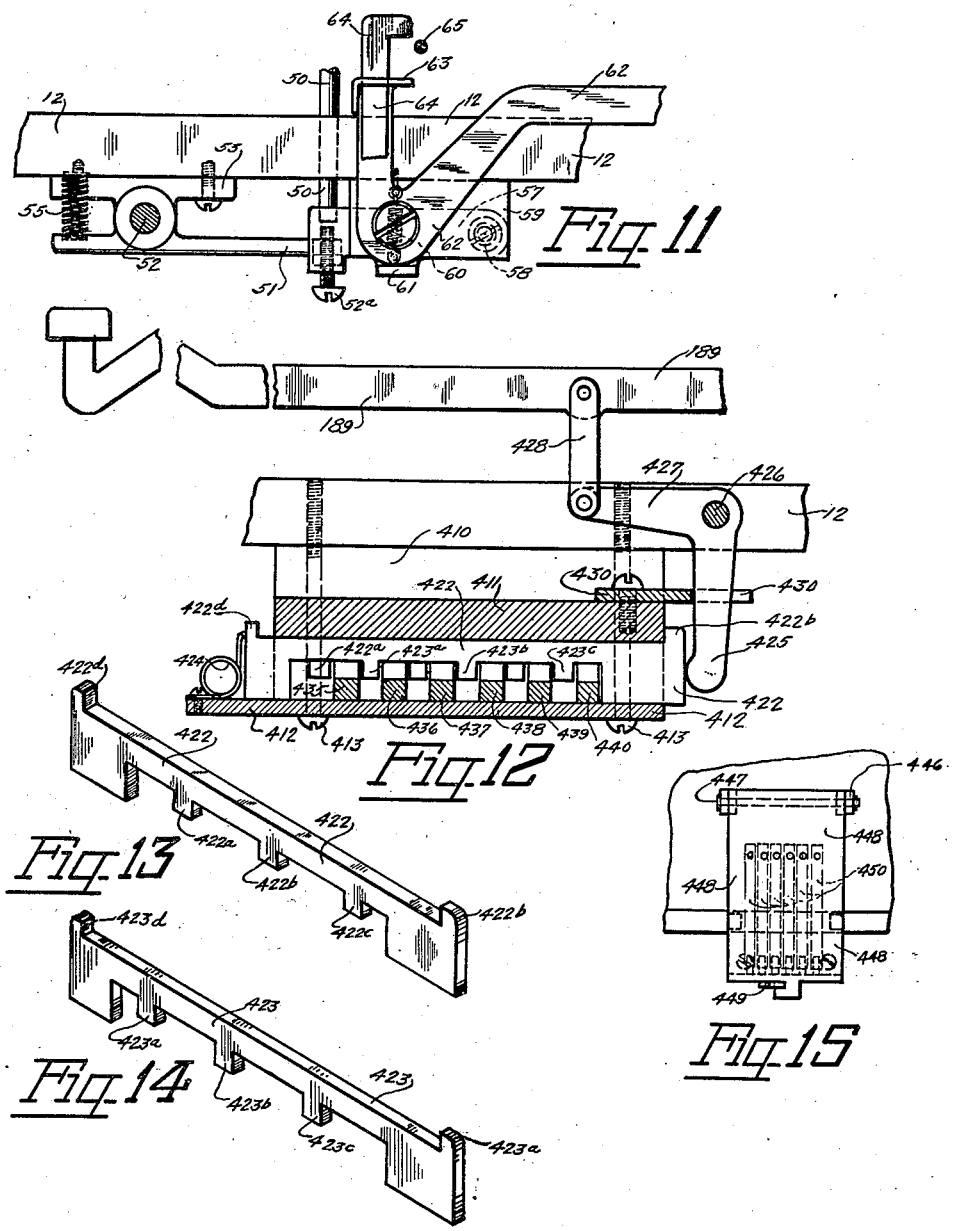

Jan. 12, 1937.  B. L. GREEN  2,067,185
MEANS FOR PREPARING CONTROL SHEETS FOR LINOTYPE MACHINES AND THE LIKE
Original Filed June 23, 1931  13 Sheets-Sheet 7
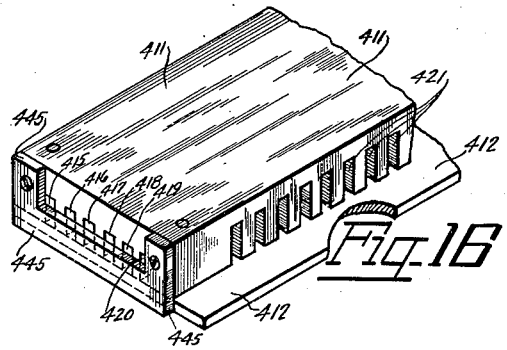
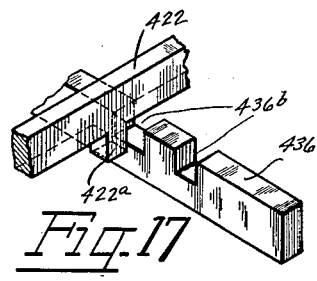
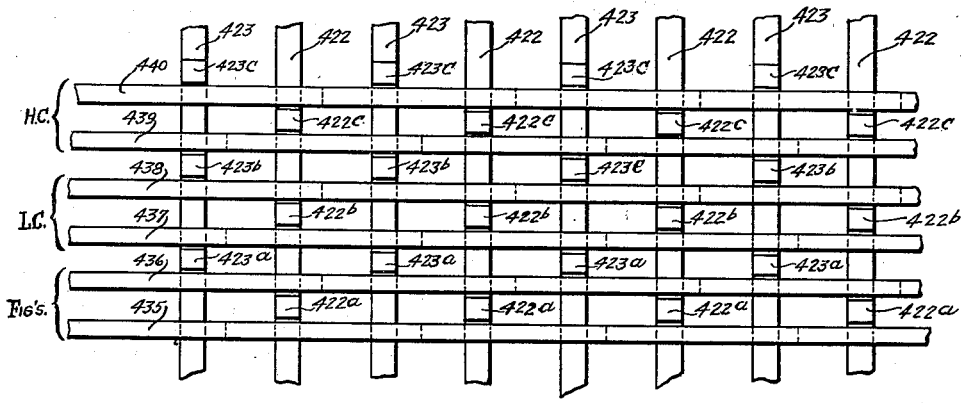
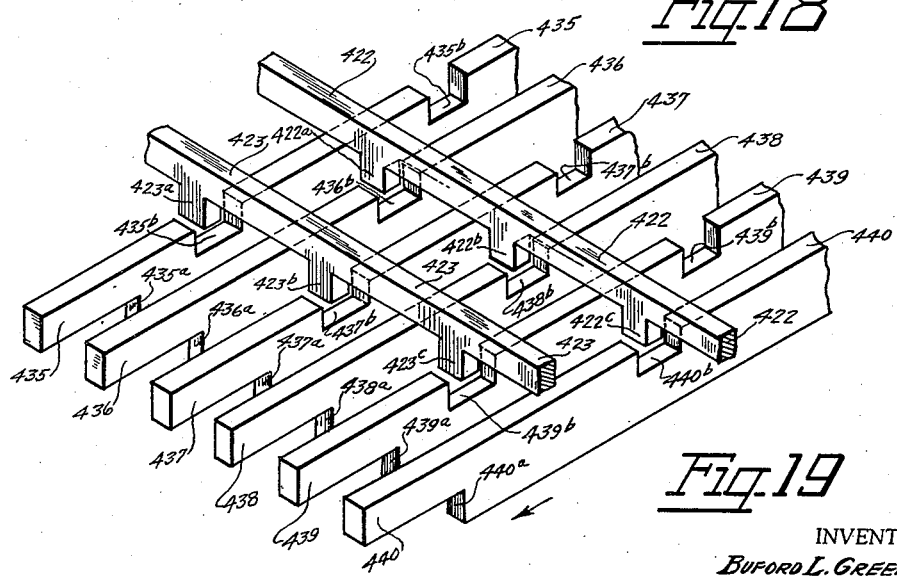
INVENTOR:
BUFORD L. GREEN
BY
ATTORNEY.

Jan. 12, 1937.  B. L. GREEN  2,067,185
MEANS FOR PREPARING CONTROL SHEETS FOR LINOTYPE MACHINES AND THE LIKE
Original Filed June 23, 1931   13 Sheets-Sheet 8
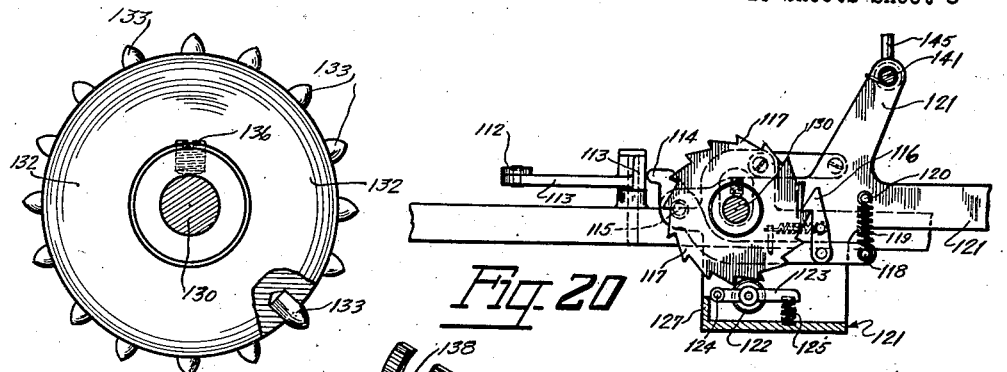
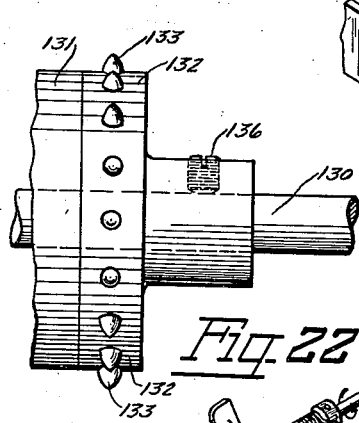
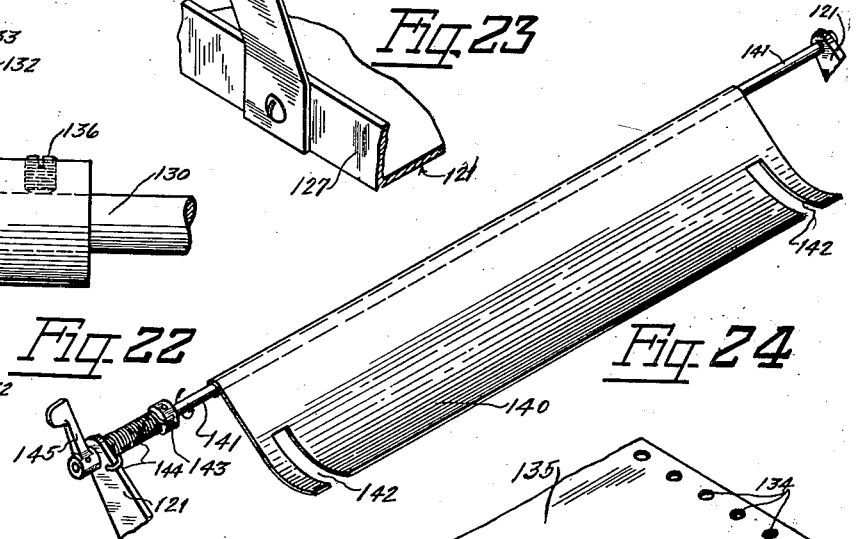
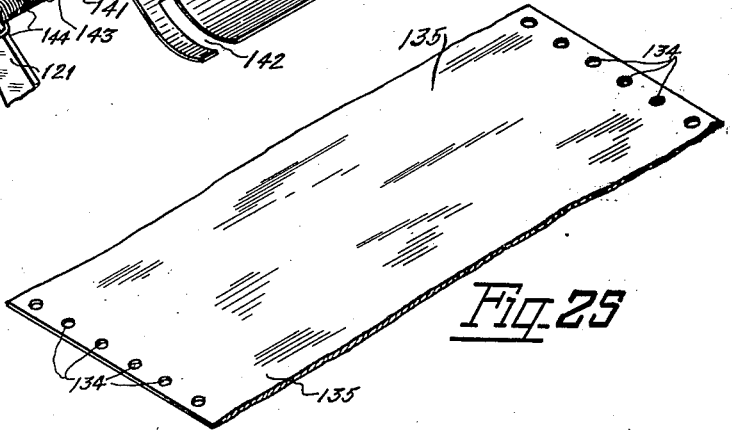
INVENTOR:
BUFORD L. GREEN
BY
ATTORNEY.

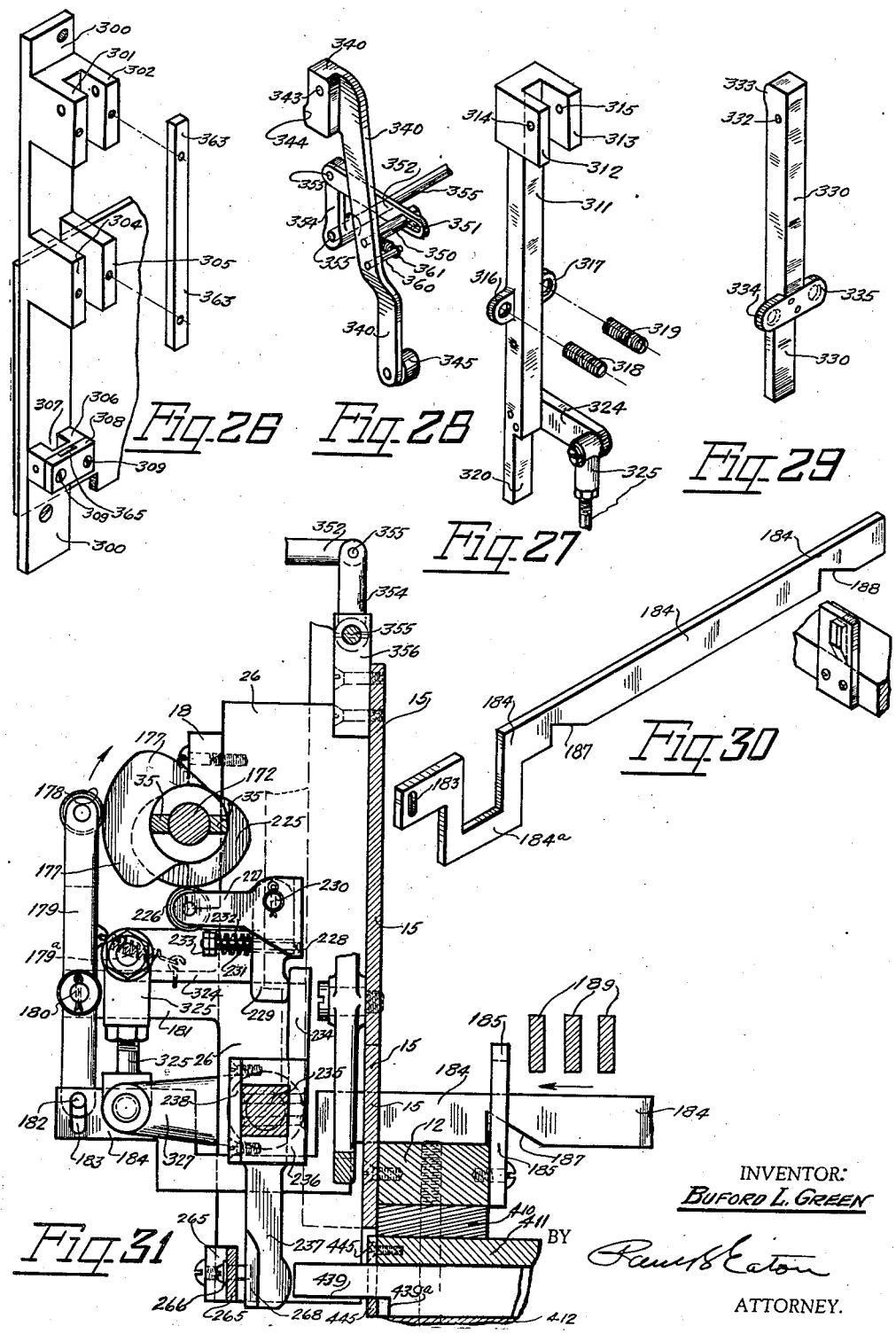
Jan. 12, 1937. B. L. GREEN 2,067,185
MEANS FOR PREPARING CONTROL SHEETS FOR LINOTYPE MACHINES AND THE LIKE
Original Filed June 23, 1931  13 Sheets-Sheet 9
INVENTOR:
BUFORD L. GREEN
BY
ATTORNEY.

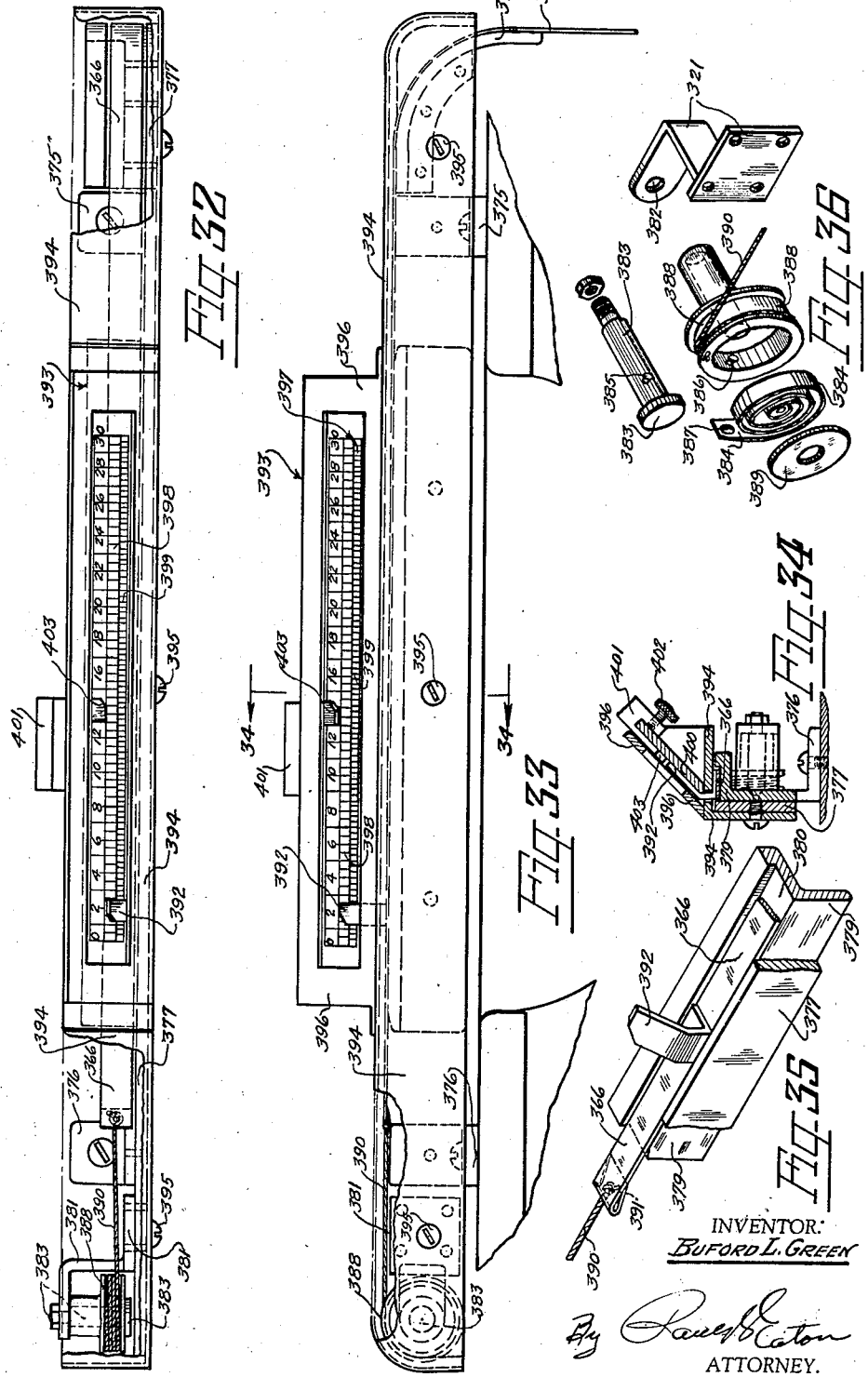

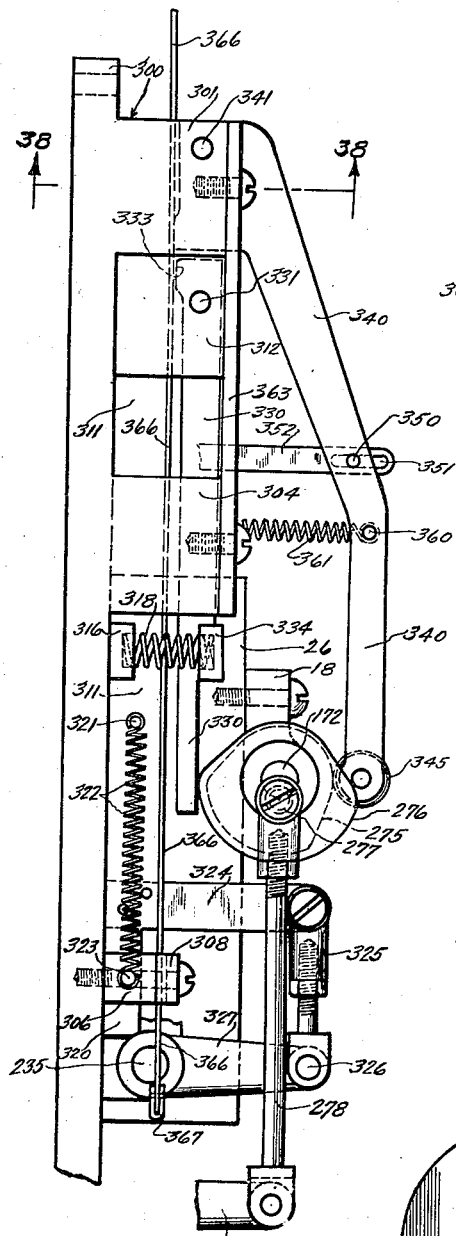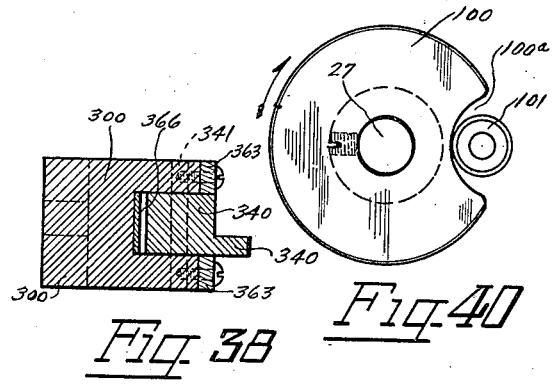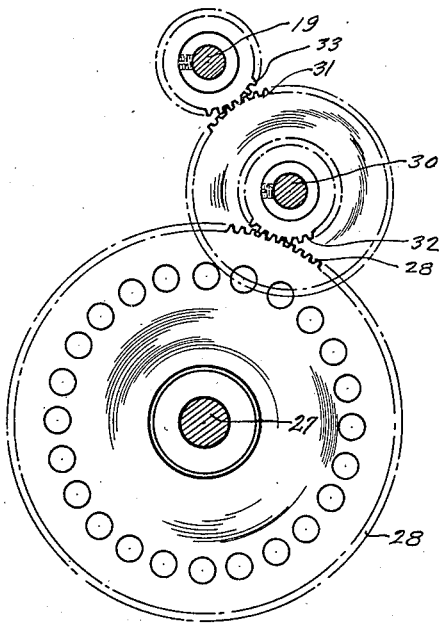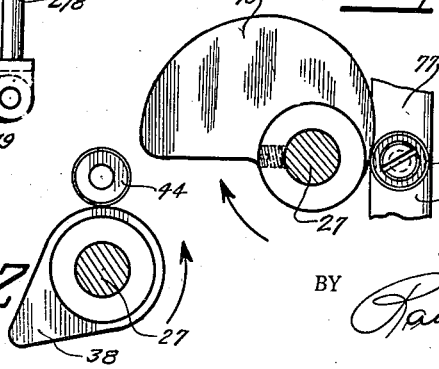

Jan. 12, 1937.  B. L. GREEN  2,067,185
MEANS FOR PREPARING CONTROL SHEETS FOR LINOTYPE MACHINES AND THE LIKE
Original Filed June 23, 1931   13 Sheets-Sheet 12
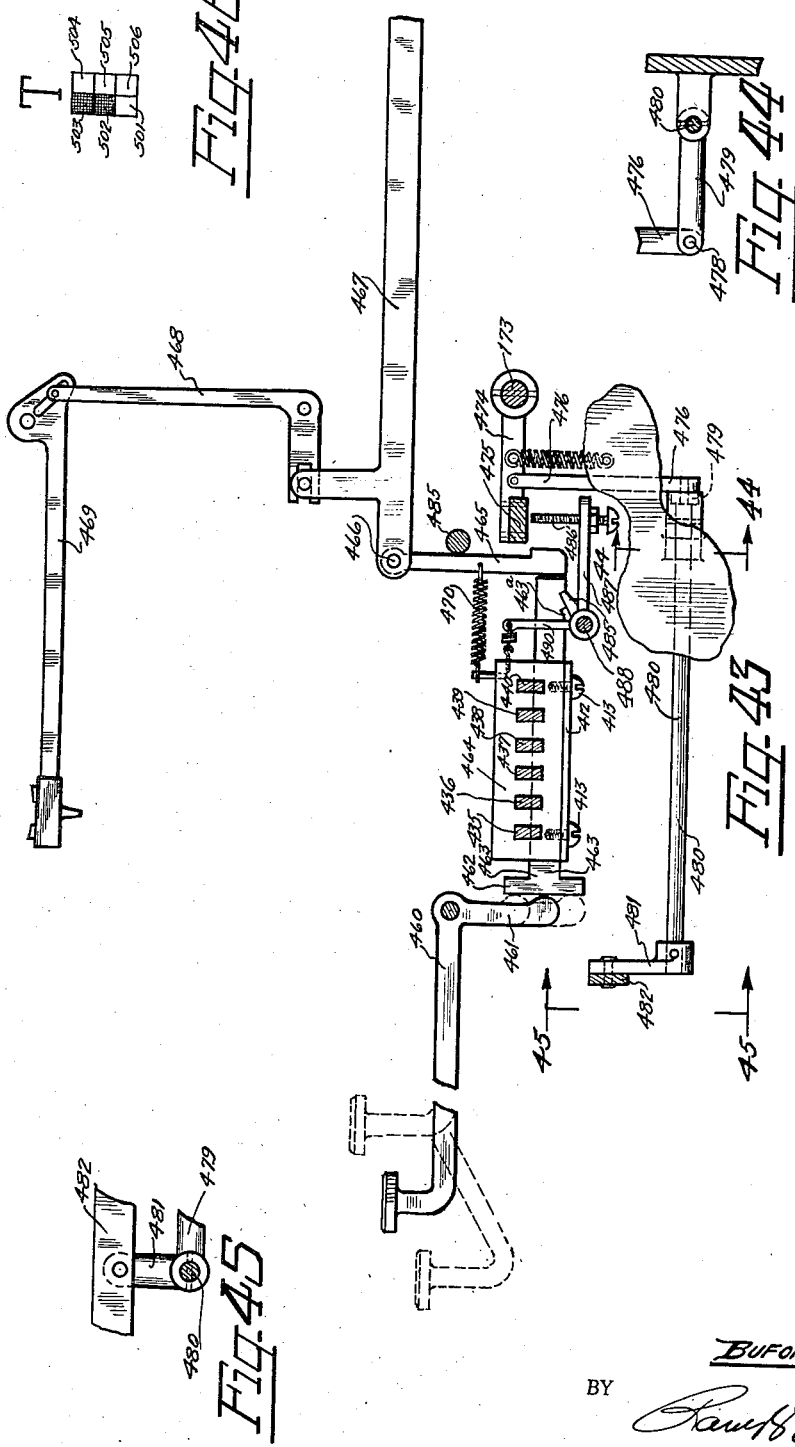
INVENTOR:
BUFORD L. GREEN
BY
ATTORNEY.

Jan. 12, 1937.  B. L. GREEN  2,067,185
MEANS FOR PREPARING CONTROL SHEETS FOR LINOTYPE MACHINES AND THE LIKE
Original Filed June 23, 1931  13 Sheets-Sheet 13
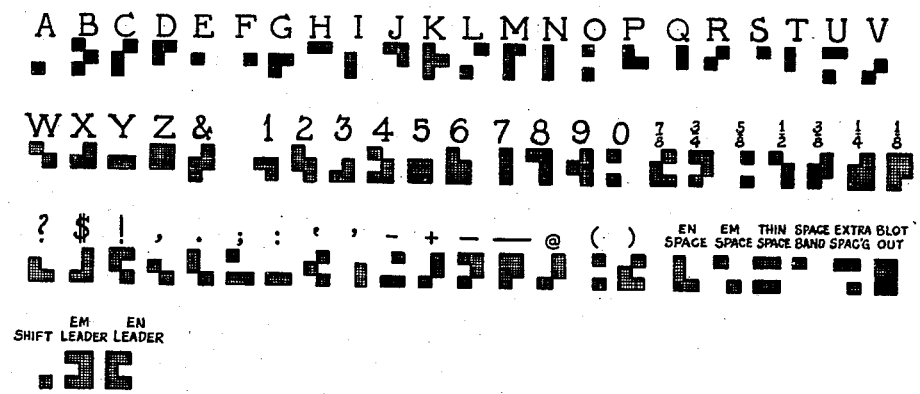
Fig. 47
BUFORD L. GREEN.
INVENTOR.
BY
ATTORNEY.

Patented Jan. 12, 1937

2,067,185

UNITED STATES PATENT OFFICE 2,067,185

MEANS FOR PREPARING CONTROL SHEETS FOR LINOTYPE MACHINES AND THE LIKE

Buford L. Green, Charlotte, N. C., assignor to Semagraph Company, Dover, Del., a corporation of Delaware Application June 23, 1931, Serial No. 546,380
Renewed January 16, 1936

60 Claims. (Cl. 197—1)

The structure disclosed in this application accomplishes mechanically a result similar to what is accomplished by mechanical and electrical means in my co-pending patent application, Serial Number 426,854, filed February 7, 1930 for Means for preparing control sheets.

This invention relates to means for preparing a control sheet said means being in the form of a typewriter having on the type bars, not only the means for printing ordinary characters as appear in regular line printing but at the same time printing on the control sheet certain photo-electric cell controls in association with the legible characters and this sheet is then adapted to be placed in means for automatically setting type in typesetting machine as disclosed in my above referred to co-pending patent application, or may be used in a machine for automatically transmitting impulses over wire or by wireless to distant points for operating a mechanism for reproducing the characters printed on the control sheet by the means hereinafter described for preparing this control sheet.

This invention relates to a mechanism adapted for use in preparing control sheets for use in means for automatically setting type in a typesetting machine and is capable of being used for preparing a control sheet adapted to control photo-electric means for automatically reproducing printed characters. Not only can this control sheet be used for controlling automatic typesetting machines, but also it is capable of a varied number of uses such as the automatic controlling of electric typewriters for transmitting messages to different points and in fact is applicable for use for controlling any mechanism for reproducing a printed sheet of material either on a typesetting machine or another typewriter electrically operated by impulses and the like received from the control sheet.

The control sheet prepared by this invention is capable of use in the structure set forth in my two co-pending patent applications, one of them being Means for automatically setting type in typesetting machines, Serial Number 404,331, filed November 2, 1929 showing a machine for setting type automatically and having many of the features thereof operated electrically and also is capable of use in connection with the structure set forth in my co-pending patent application, Serial Number 517,171 filed February 20, 1931 for Automatic means for setting type and the like, which structure is largely mechanical and accomplishes in a different manner approximately the same results as accomplished by the first mentioned co-pending patent application.

The invention relates to means for preparing a control sheet and printing at the same time on the control sheet both legible characters and code characteristics associated with the legible characters with said code characteristics being so positioned for each legible character as to operate certain mechanism as disclosed in my above referred to co-pending patent applications as to automatically cause the means associated with the typesetting machine to automatically set the type. The means for preparing the control sheet can be operated as a conventional typewriter with said means having thereon certain indicating means for indicating the amount of space a character will occupy in regular line printing and indicating during the writing of a line on the control sheet of the total amount of space occupied by the characters on the control sheet in regular line printing, and also indicating the amount of space left in the line at a given time of regular line printing so as to enable the operator of the typewriter to prepare the control sheet ready to be inserted into the automatic typesetting means for automatically setting the type therein thus dispensing with the necessity of a linotype operator. The operator of the typewriter can also determine at any time the expansibility of the space bands in a line at a given time.

The present embodiment of the invention contemplates the use of a conventional typewriter with certain modifications and additions thereto and the use of the ordinary keys of a typewriter which have both figures and letters thereon and by operating the key bars of the typewriter in the conventional manner, lower case printing will be effected and suitable cell controls will be placed on the control sheet to cause the automatic typesetting means to set a lower case letter in the line casting machine, and then when the capital letter shift is pressed downwardly in a conventional manner a code characteristic will be placed on the control sheet immediately in front of and below the legible character which will be printed immediately thereafter by the typewriter and this code characteristic will control the typesetting means to cause a capital letter to be set by the typesetting machine, and when lower case letters are desired to be eliminated for a certain character and a capital letter placed instead thereof, a selected key bar is suitably connected with the mechanism of the typewriter so that when it is depressed a cell control code characteristic will be placed on the control sheet and immediately thereafter, the selected letter desired to be of an upper case will be printed by the typewriter by the depression of the key bar for such letter and in this manner upper case letters are caused to be set in the line of regular line printing by the typesetting machine operated by the control sheet.

When numerals and other characteristics such as abbreviation marks and other peculiar signs allied with the printing trade, are desired to be printed by the type bars the regular capital letter shift is depressed downwardly and locked in position if necessary in the conventional manner, and while the capital letter shift is depressed downwardly the figures appearing on the key bars and other peculiar characteristics allied with the art of printing will be printed by the type bars on the control sheet, together with their cell controls.

In the especially equipped typewriter shown in the accompanying drawings, I provide means whereby the tabular key is so connected with the mechanism of the typewriter that when it is depressed, the carriage will be automatically returned to the beginning of a new line and the control sheet will be shifted to a new line position in the carriage.

The printing of the characters and cell control sheets is accomplished by manual pressure on the key bars, but the carriage return and varied other mechanism operated in this especially equipped typewriter are operated by power derived from a suitable motor for operating the mechanism in association with the manual operation of the key bars.

Another object of this invention is to provide an indicating device for measuring the amount of space occupied in regular line printing by a character by providing a very light weight tape member adapted to be moved to indicate the amount of space occupied by a particular character in regular line printing and the tape is of such light weight that no momentum is imparted to the tape in moving the same. Therefore, the tape stops at exactly the proper point and measures accurately the amount of space occupied by a character in regular line printing.

Some of the objects of the invention having been stated, other objects will appear as the description proceeds when taken in connection with the accompanying drawings, in which—

Figure 4 is a bottom plan view of the portion of the typewriter shown in top plan in Figure 3;

Figure 11 is a detail of a mechanism associated with the extra space bar on the typewriter to print a space cell control at the beginning of a line on the control sheet;

Figure 12 is a view partially in cross section taken along line 12—12 in Figure 4, and indicating the means associated with each key bar for measuring the amount of space occupied by a character in regular line printing;

Figure 13 is an isometric view of one of the cross bars in the measuring mechanism;

Figure 14 is an isometric view of another form of cross bar in the measuring mechanism, the structure shown in Figures 13 and 14 appearing in pairs;

Figure 15 is a view of a portion of the typewriter as viewed in Figure 1 along the line 15—15 for holding the longitudinal measuring bars in position;

Figure 16 is an isometric view of a portion of the casing for the measuring device and showing the slots for the longitudinal bars and some of the cross bars, looking from the right hand side of Figure 2;

Figure 17 is an isometric view of an intersecting portion of one of the longitudinal bars and one of the cross bars in the measuring mechanism;

Figure 18 is a bottom plan view of a portion of the longitudinal and transverse measuring bars in the measuring mechanism with the casing removed;

Figure 19 is an isometric view showing two of the transverse bars and a portion of the longitudinal bars in the measuring mechanism;

Figure 20 is a detail of the means for moving the platen to a new line position, being taken along the line 20—20 in Figure 3;

Figure 21 is an elevation of one of the toothed wheels on each end of the platen for engaging perforations in the control sheet for properly aligning the same and showing a portion broken away for clearness;

Figure 22 is an elevation of an end of the platen showing the toothed wheel as it appears in Figure 21;

Figure 23 is an isometric view of means for holding the control sheet in engagement with the teeth on the toothed wheels at each end of the platen;

Figure 24 is a perspective view of a guide associated with the rear surface of the platen;

Figure 25 is an isometric view of a portion of a blank perforated control sheet;

Figure 26 is an isometric view of a portion of the means for clamping the measuring tape;

Figure 27 is an isometric view of the mechanism adapted to fit within and be associated with the structure shown in Figure 26 for pulling the tape to indicate the amount of space occupied by a character or plurality of characters in regular line printing;

Figure 28 is an isometric view of the upper clamping means in the tape feeding mechanism;

Figure 29 is an isometric view of the lower clamping means in the feeding mechanism;

Figure 30 is an isometric view of a bar adapted to pass beneath the key bars on the typewriter for locking the key bars against operation during a portion of the time while the typewriter is in running condition;

Figure 31 is a cross sectional view taken along the line 31—31 in Figure 2;

Figure 32 is a plan view with portions thereof broken away of the indicating mechanism;

Figure 33 is a front elevation of the indicating mechanism with portions thereof broken away for clearness;

Figure 34 is a cross sectional view taken along the line 34—34 in Figure 33;

Figure 35 is an isometric view of a portion of the indicating mechanism and showing the tape with the indicator finger thereon;

Figure 36 is an exploded isometric view of the parts of the drum held under tension for returning the indicating tape to normal position when released by both of the clamping means;

Figure 37 is an enlarged elevation of a portion of the mechanism appearing at the right hand side of Figure 1;

Figure 38 is a cross sectional view taken along the line 38—38 in Figure 37;

Figure 39 is a view showing the gear train taken along the line 39—39 in Figure 2;

Figure 40 is a view of the spacing cam for moving the platen to a new line position; taken along the line 40—40 in Figure 2;

Figure 41 is a view of the cam and lever associated therewith for operating the carriage return and being taken along the line 41—41 in Figure 2;

Figure 42 is a view of the cam and roller associated therewith for operating the extra spacing mechanism and taken along the line 42—42 in Figure 2;

Figure 43 shows a modified form of the key bars and type bar and the means for operating the type bars from the key bars by passing the operating means directly thru the measuring means and provides means whereby the type bars may be operated by a power such as an electric motor instead of manually;

Figure 44 is a view taken along the line 44—44 in Figure 43;

Figure 45 is a detail taken along the line 45—45 in Figure 43;

Figure 46 is an enlarged view of a legible character and the cell controls as printed by the typewriter on the control sheet;

Figure 47 is a view showing the characters and cell controls as printed by the type bars.

Figure 1:
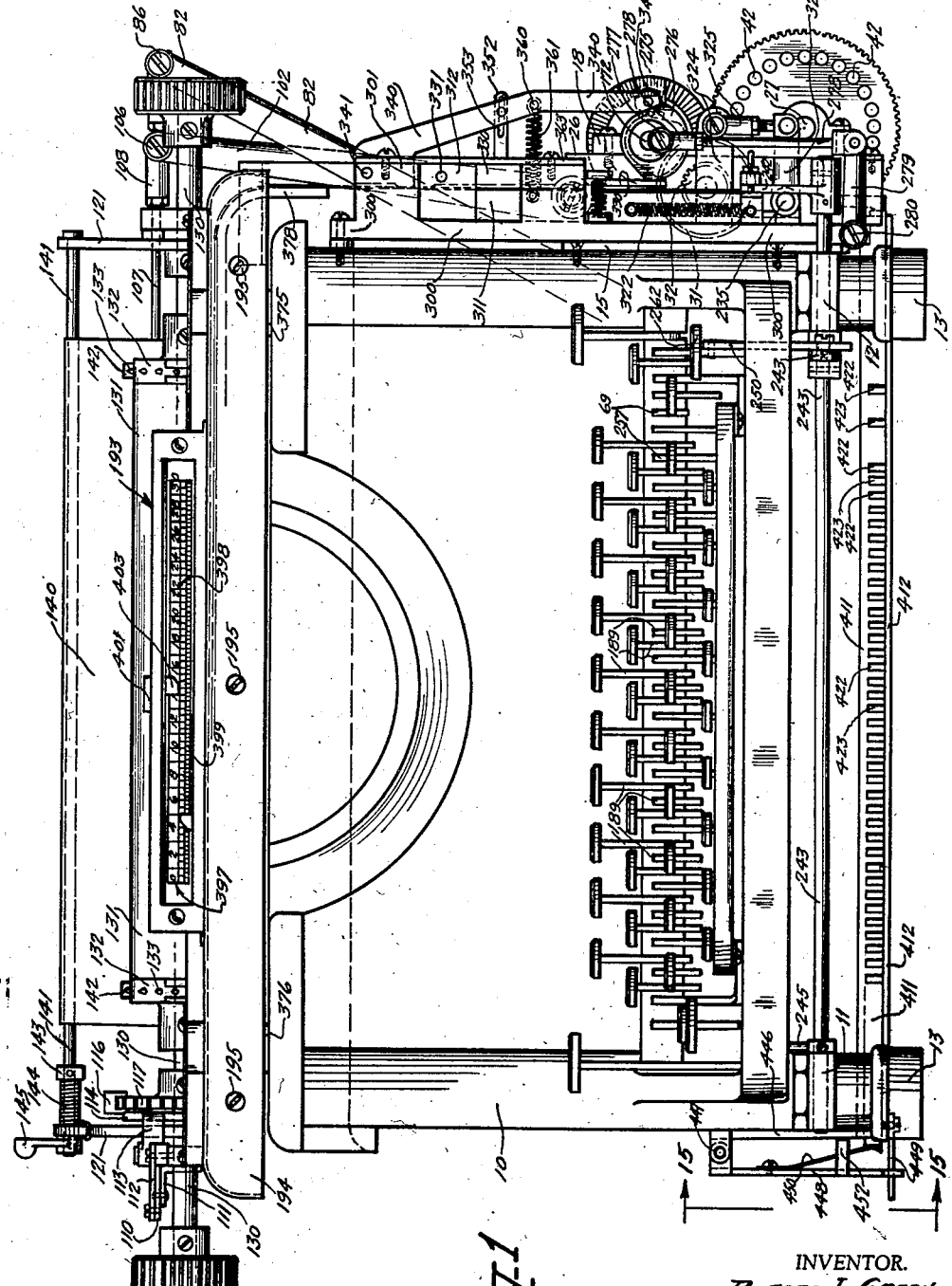
Figure 1 is a front elevation of a typewriter equipped with my mechanism for preparing the control sheet.

Referring more specifically to the drawings, the numeral 10 indicates the framework of a conventional typewriter and the rubber cushion supports are removed therefrom and two longitudinally disposed bars 11 and 12 are secured to the bottom of the typewriter and the conventional rubber cushion supports 13 are placed at each end of each of the bars by conventional means such as screws 14.

Secured to one side of the typewriter is a plate 15 on which a portion of the mechanism associated with the typewriter for preparing the control sheet is mounted. The plate 15 has secured thereon strips 24, 25 and 26 to which are secured bearing members 16, 17, and 18 in which a main drive shaft 19 is rotatably mounted and said drive shaft has a spur gear 20 on one end thereof which is adapted to mesh with a pinion 21 on the shaft of motor 22 for driving the mechanism. The motor 22 is mounted on plate 23 mounted on one end of bar 12.

Rotatably mounted in the lower portion of bearing blocks 16 and 17 is a shaft 27 which has loosely mounted thereon a gear wheel 28 which gear wheel is held loosely on the shaft by collar 29. Mounted in bar 25 is a stud bolt 30 on which is loosely mounted a compound gear comprising pinion 31 for the larger gear and 32 for a smaller gear, the smaller gear meshing with gear 28 and the larger gear meshing with the pinion 33 of main drive shaft 19.

Loosely and slidably secured on shaft 27 is clutch arm 34 which has projections 35 thereon adapted to engage cavities 36 in hub portion 37 of cam member 38 which cam is fixedly secured on shaft 27. Clutch arm 34 has therein a longitudinal cavity in which is mounted a compression spring 40 and in hub portion of cam 38 is a pin 41 which projects into the cavity in the clutch arm and against the compression spring therein to normally press clutch arm toward the gear wheel 28.

Gear wheel 28 has a plurality of holes 42 therein which are adapted to be engaged by a pin 43 in the clutch arm when the clutch arm is released to cause clutch arm to be driven by gear 28. Cam 38 is adapted to press against a roller 44 at all times, which roller is mounted in the free end of a lever 45 pivoted as at 46 intermediate its ends to a projection 47 extending from plate 15 and the other end of this lever is adapted to depress a link 48 which link is pivotally mounted as at 49. Intermediate the pivot point of link 48 and the point where the lever presses against the upper side thereof a vertically movable pin 50 is adapted to be depressed by this link to cause the lower end of said pin to press downwardly on one end of a lever 51 which has a set screw 52a therein adapted to coincide with pin 50 to limit the amount of movement given to lever 51 by the downward movement of pin 50 and this lever 51 is pivotally mounted on shaft 52, which shaft 52 spans the typewriter on the lower side thereof and is pivotally mounted at its ends in bearing members 53 and 54 secured to bars 11 and 12.

The other end of lever 51 has a compression spring 55 engaging the same and the other end of the compression spring is seated in bar 12 to normally force the set screw end of lever 51 upwardly toward pin 50, the purpose of this arrangement being to release the extra spacing key at the beginning of the line as will be later described, and it also operates the escapement mechanism to allow one letter space at the beginning of the line. This member 51 is T-shaped at its end and one portion thereof has a set screw 52a therein as described, and another laterally projecting portion (see Fig. 4) projects above a laterally projecting portion 56 of member 57 which is pivoted as at 58 on a projection 59 extending downwardly from bar 12.

A tension spring 60 normally pulls member 57 upwardly and member 57 has a laterally projecting portion 61 (see Fig. 11) adapted to engage extra spacing key bar 62 to frictionally hold the same in position normally, and extra spacing key bar 62 projects upwardly and is forked at its upper end as at 63, thenceforth passes on both sides of a hooked member 64 which is adapted to engage a pin 65 on key bar 69 which has no key thereon in the key board, but it is connected to a type bar having an extra spacing code characteristic thereon and this allows operation of the same when the extra spacing key in the key board is touched by the operator to print an extra spacing character at the beginning of a line after the line is written and the carriage is returned ready for partial rotation to move the control sheet to new line position. This operation is done only when the operator desires extra spaces to fill out a line.

Member 64 (see Fig. 10) at its lower end is pivotally connected as at 66 to an arm 67 and a tension spring 68 is connected to both arm 67 and hook member 64 to normally pull member 64 from out of the path of pin 65 in its vertical movement. Arm 67 is fixedly secured to shaft 52 for operation. Shaft 52 also has secured thereon an arm 70 which projects upwardly thru the typewriter and operates the conventional escapement mechanism to allow one letter space to be imparted to the platen when the extra space bar mechanism, just described, is operated.

A carriage return mechanism is provided and includes a cam 75 fixed on shaft 27 alongside cam 38. Cam 75 is adapted to press against a roller 76 on pin 77 in lever 78 which lever 78 at its upper end is pivoted on shaft 79 disposed between strips 24 and 25. The lower end of lever 78 has pivotally connected thereto a link 80 which link at its other end is pivotally connected as at 81 to the lower end of a compound bell crank lever 82 (see Figs. 3 and 4) which bell crank lever has the parallel portion 83 whose ends are mounted pivotally in bars 84 and 85 extending from bar 12, and the other end of this compound bell crank lever projects upwardly a substantial distance to near the top of the typewriter where it is pivotally connected as at 86 to a connecting rod 87, said connecting rod being adjustable as to length as shown at 88, and the other end of this connecting rod is pivotally connected to a member 89 pivotally connected to the carriage mechanism as at 90 and has a tension spring 91 connected to the outer end thereof which is secured to a pin 92 on the carriage mechanism to give resiliency to this connection.

The above described arrangement provides a carriage return which is automatically operated by the mechanism and is placed in operation when the shaft 27 is rotated.

Figure 2:
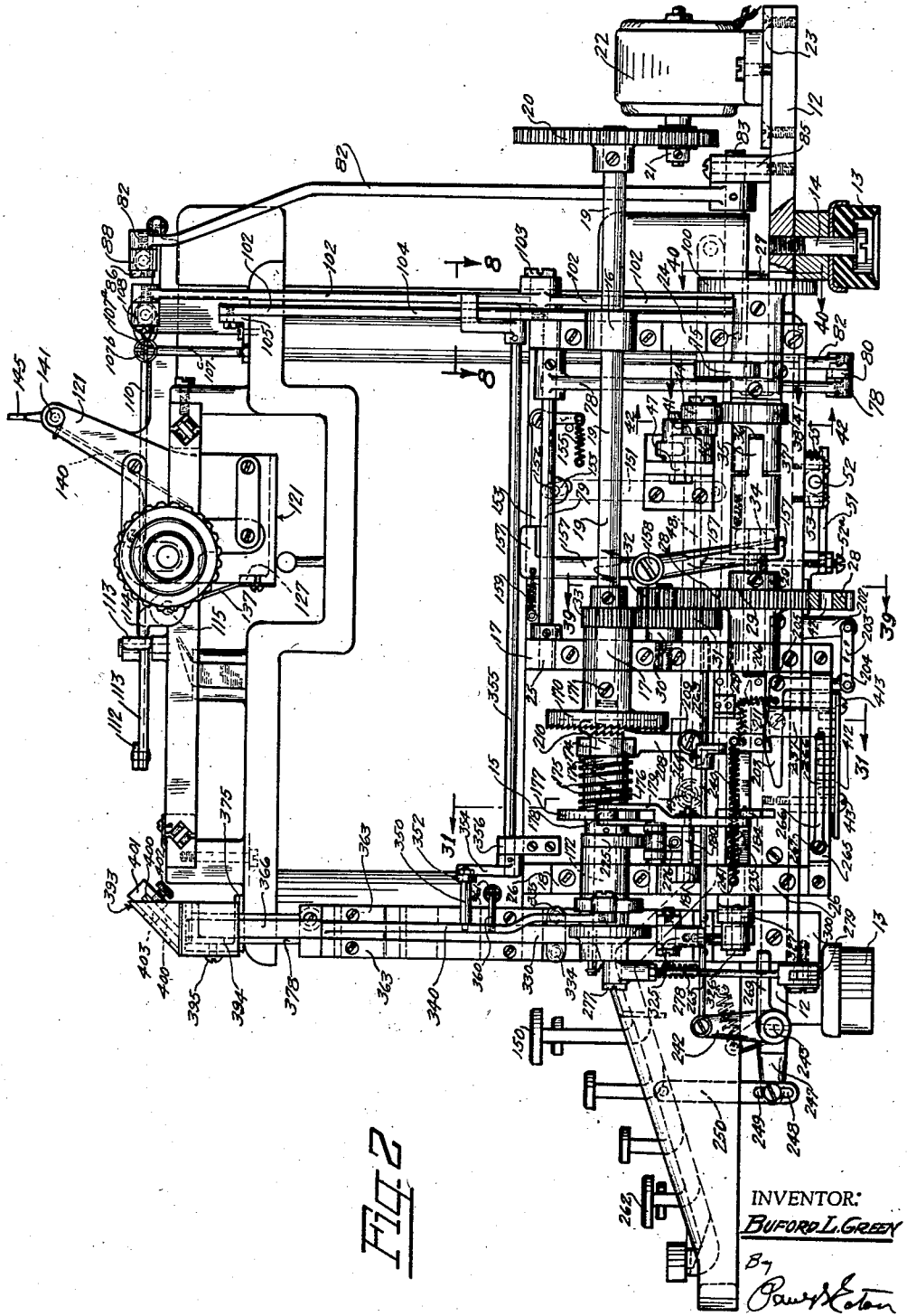
Figure 2 is a side elevation looking from the right hand side of Figure 1.

At the extreme right end of shaft 27 as viewed in Figure 2 is a cam 100 which operates means for moving the platen to new line position. This cam is followed by a roller 101 in the lower end of a lever 102 pivotally secured intermediate its ends on a stud bolt 103 which is secured in a vertically disposed bar 104 which bar is secured to strip 24 and also to an angular projection 105 at its upper end, which projection is secured to the top frame portion of the typewriter.

Figure 3:
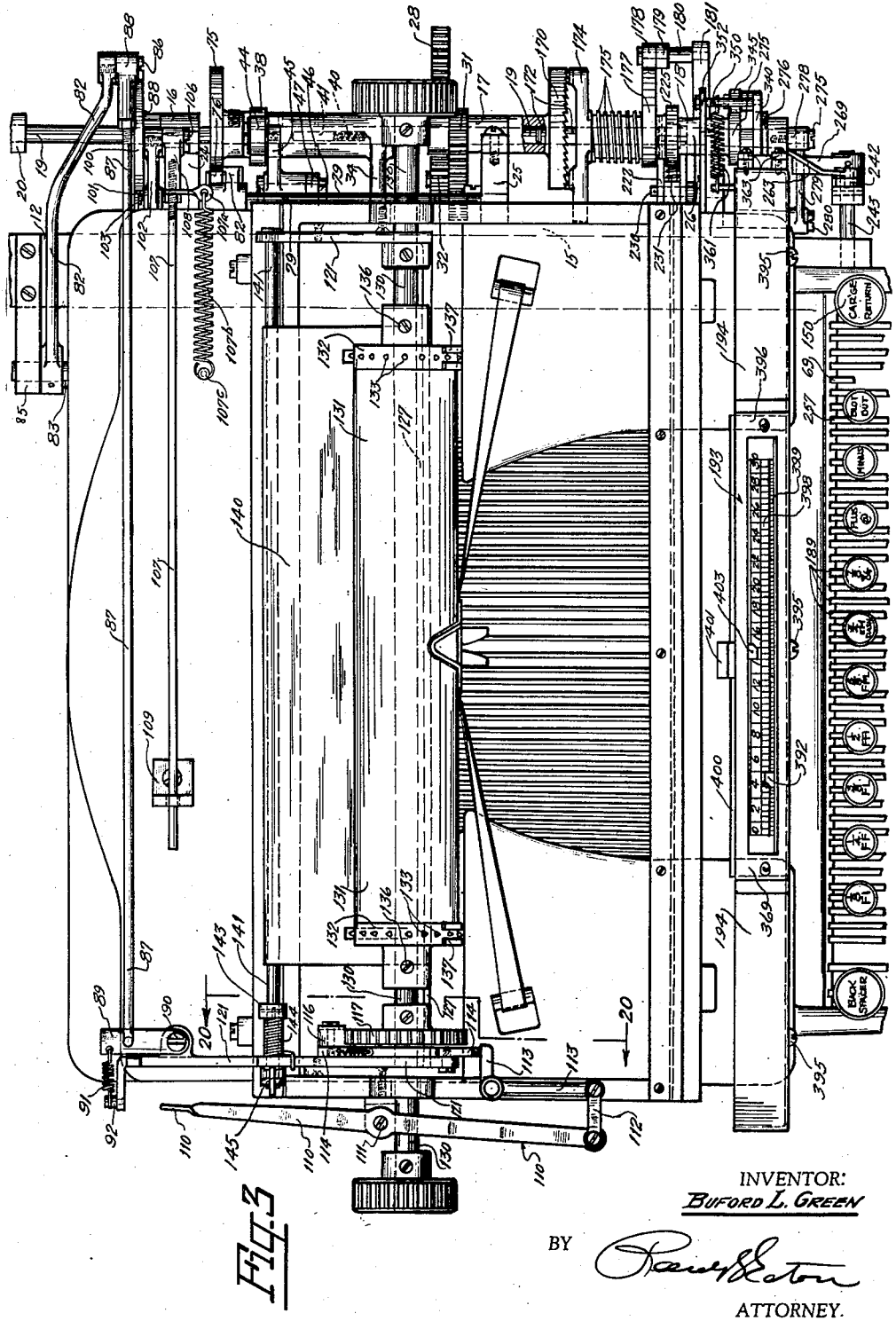
Figure 3 is a plan view of the especially equipped typewriter with a portion of the key board broken away.

The upper end of lever 102 has pivotally secured thereto as at 106 a push rod 107 adjustable as to length as shown at 108 which push rod is slidably mounted close to its other end in a bracket 109 extending upward from the typewriter frame, and the extreme end of push rod 107 is adapted to engage one end of a lever 110 which is pivotally secured intermediate its ends on the carriage mechanism as at 111 (see Fig. 3). Secured on rod 107 is an eye-member 107a which has one end of a tension spring 107b secured thereto, and the other end of tension spring is secured to a pin 107c in the typewriter frame, this spring operating spacer mechanism when roller 101 coincides with cavity 100a in cam 100, (Figure 40).

Regular spacer bar 71 has a key bar 72 with no key thereon, but this key bar operates a suitable type bar having a cell control printing means thereon to print a space cell control on the control sheet.

The lower end of lever 110 has pivotally secured thereto a link 112, the other end of this link being pivotally secured to a bell crank lever 113, the short leg of the bell crank lever being adapted to engage conventional ratchet lever 114 (see Fig. 20) pivoted as at 115 and having a dog 116 pivotally secured thereon and adapted to engage ratchet wheel 117 on the platen of the typewriter.

The other end of lever 114 is supported as at 118 by a tension spring 119 secured at its other end as at 120 to the carriage framework 121. The framework 121 has a conventional roller 122 supported in a member 123 pivoted as at 124 and resiliently pressed toward the ratchet wheel by compression spring 125.

Ratchet wheel 117 is fixedly secured on shaft 130 of the platen which has mounted thereon a conventional platen 131 and at each end of the platen is a wheel 132 secured on shaft 130 and these wheels have pins 133 projecting from the periphery thereof adapted to penetrate holes 134 in control sheet 135 to cause the control sheet to aline properly while it is in the typewriter and also to aline when it is taken from the typewriter and is placed in the means for automatically setting type in the typesetting machine or any other machine where it might be placed for automatic operation thereof.

Furthermore, the perforations prevent any slippage whatever of the control sheet in the typewriter and insures a uniform distance between the lines when the control sheet is moved to new line position. The wheels 132 at each end of the platen may be adjusted in any desired position separately from the platen as they are separate therefrom and are adjustably secured on the shaft 130 by means of set screws 136 (see Figs. 21 and 22).

The lower portion of frame 121 as shown in Figures 20 and 23 has an upturned portion 127 and has extending upwardly therefrom leaf spring member 137 which has a slot 138 in the free end thereof which is open at the upper end thereof and is adapted to coincide with the teeth 133 in the wheels 132 at each end of the platen so as to cause the control sheet 135 to be pressed against the wheels 132 with the proper degree of pressure to insure the registry of the pins 133 with the holes 134 at all times.

Also secured to the frame 121 of the carriage and at the rear of the platen and projecting downwardly and below the platen is a shield member 140 (see Fig. 24) which is fixed on a rod 141 mounted at its ends in frame 121, and this shield has slots 142 open at one end adapted also to coincide with the wheels 132 at each end of the platen and thru which slots the pins 133 on wheels 132 are adapted to pass, the purpose of this shield being to insure the proper insertion of the control sheet into the typewriter and to cause the pins 133 on wheels 132 to register with the holes 134 in control sheet 135 when the control sheet is inserted into the typewriter.

Fixed on rod 141 is a collar 143 which has fixedly secured thereto one end of a torsion spring 144 which has its other end secured to frame 121 to cause shield 140 to press against the control sheet to hold it snugly against the platen. Lever 145 is secured on one end of shaft 141, and by manual pull on the lever 145, the pressure of shield 140 against platen will be released for the insertion of the control sheet into the carriage mechanism for the beginning of the writing operation.

What is known as a conventional tabular key in a conventional typewriter is used for placing into operation the means for returning the carriage, and in the drawings it is seen that the tabular key is indicated by reference character 150 which tabular key is mounted in the typewriter in the conventional manner by being pivoted at the rear end thereof, and intermediate the ends of the tabular key is pivoted a link 151 (see Fig. 2) which projects upwardly and has an elongated pin 152 therein which projects thru a slot in plate 15 and is secured intermediate the ends of a lever 153 which lever is pivotally mounted as at 154 on plate 15 and the said lever has a downwardly projecting portion to which is secured a tension spring 155. The other end of the tension spring 155 is secured to plate member 15. The purpose of this tension spring being to normally press the left hand end of the lever as shown in Figure 2 upwardly. The left hand end of the lever just described is adapted to be engaged at times by a lever 157 which is pivoted as at 158 to plate 15 and has secured thereto a tension spring 159, said tension spring at its other end being secured to plate 15, the purpose of this tension spring being to normally pull lever 157 at its upper end away from lever 153 to allow the tabular or carriage return key to assume a normal position.

The lower end of this lever 157 is adapted to be engaged by clutch arm 34 for the purpose of releasing the tabular key, and this also serves to release clutch arm and the pin carried thereby from engagement with gear wheel 28 and therefore stops movement of clutch arm and cams 38, 75 and 100 and the mechanism associated therewith after a complete revolution of shaft 27 has been made.

Immediately after passing thru bearing member 17, shaft 19 has secured thereon a clutch disk 170 (see Fig. 2) which has a hub portion which fits onto shaft 19 with shaft 19 penetrating part of the way into the hub and this hub portion is secured on the shaft 19 by means of a suitable set screw 171. This leaves a portion of the hole in the central portion of the hub of the clutch disk unoccupied which serves as a bearing point for end of shaft 172 which shaft is also mounted in bearing member 18.

Clutch disk 170 has a toothed or serrated face portion adapted to be engaged at times by a dog 174 which is loosely and slidably mounted on shaft 172 and a compression spring 175 normally presses dog member against clutch disk. The compression spring is mounted on a hub portion 176 of a cam 177 and the other end of this compression spring rests against the side of said cam.

In order to prevent crowding of the mechanism, means are provided to lock the key bars against operation for a short time after a key bar is depressed. This mechanism is controlled by the cam 177 which is adapted to press against a roller 178 (see Fig. 31) on the upper end of lever 179. Lever 179 is pivotally mounted intermediate its ends as at 180 on a projection 181 extending from strip 26. The lower end of lever 179 has a pin 182 therein which has movement in a vertically disposed slot 183 in one end of an irregularly shaped lever 184 which bar has a U-shaped portion 184a (see Fig. 30) to avoid other parts of the structure and then this bar 184 slidingly penetrates plate 15 and extends laterally across the typewriter beneath the key bars and is supported by projections 185 and 186 secured to bars 11 and 12. Bar 184 has sloping surfaces 187 and 188 in the lower surface thereof. Spring 179a causes roller 178 to follow cam 177 at all times.

Cam 177 is shown in Figure 31 as being in a position to cause bar 184 to be in lowered position to allow the key bars to be depressed to operate the type bars but it is seen that one side of cam 177 as viewing it in Figure 31, is cut down to a small arc, and when roller 178 is travelling along the small portion of cam 177 it will move bar 184 to the left in Figure 31 and the inclined surfaces 187 and 188 will cause bar 184 to be raised upwardly to prevent any of the key bars from being depressed while the mechanism is in this position, the purpose of this being to prevent a typist from crowding the machine by writing too fast as it is impossible to depress a key bar to operate the machine for the placing of another letter on the control sheet and measuring the same and operating all of the other mechanisms associated with the typewriter until the cam has passed around to cause the bar 184 to be lowered back to a position to where the key bars 189 can be operated. All of the conventional bars in the typewriter except the few specially provided ones for special operation are controlled by this bar and all of these key bars are indicated by the reference character 189 in all places.

Figures 9, 10:
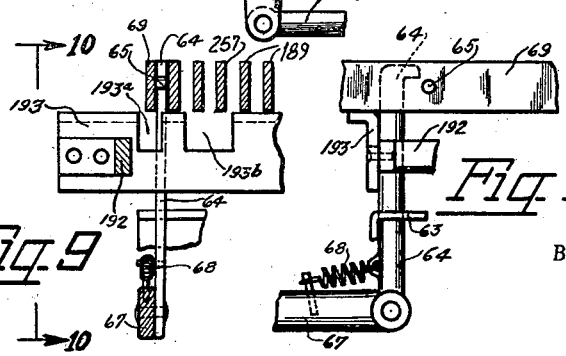
Figure 9 is a cross sectional detail taken along the line 9—9 in Figure 4.
Figure 10 is a side elevation of Figure 9, taken along the line 10—10 in Figure 9.

In order to impart one revolution to shaft 172 on depression of a key bar controlling a character to be set in type and therefore measured, and in order to insure against more than one revolution of shaft 172 for each key bar depressed there is secured beneath the typewriter and near the rear end thereof is a transversely disposed rod 190 (see Fig. 4) which has arms 191 and 192 for supporting a bar 193 extending beneath all of the key bars except a few of the bars for special operation such as the blot-out key bar, the shift key bar, the extra space key bar, which are not desired to be measured in the indicating device to be later described, as shown by notches 193a and 193b in Figure 9.

Figure 7:
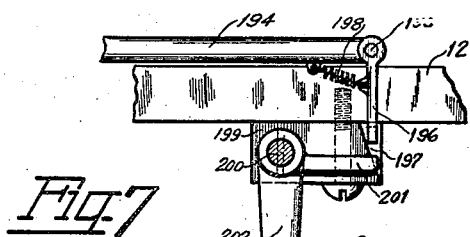
Figure 7 is a detail of a portion of the clutch release operated by the key bars.
Figure 8:
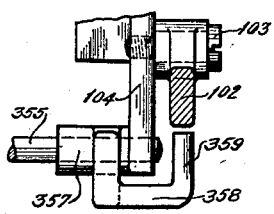
Figure 8 is a portion of the mechanism for releasing the measuring tape to allow it to return to normal position.

Also secured on said transversely disposed rod 190 is an arm 194 which projects forwardly in the machine and has pivotally secured on the end thereof as at 195 a pawl 196 (see Figs. 4 and 7) normally held against cam surface 197 on block 199 by a tension spring 198, said block being secured on the lower side of bar 12.

Block 199 has a transversely disposed shaft 200 turnably mounted therein and extending from both inner and outer sides thereof, and a lever 201 is secured on shaft 200 on the inside of this block in the path of dog 196 and on the outside of this block and fixedly secured on shaft 200 is a downwardly extending lever 202 which has pivotally secured on the lower end thereof a link 203 which has its other end pivotally secured to a bell crank lever 204 which is pivoted as at 205, and a tension spring 206 normally holds the bell crank lever 204 in such a position as to hold lever 201 in the path of dog 196.

Bell crank lever 204 extends forwardly and laterally and has a latch 207 on the end thereof which is adapted to engage the lower end of a lever 208 which is pivoted intermediate its ends as at 209 and the upper end of this lever has a cam surface indicated as at 210. When lever 208 is locked in position at its lower end it is adapted to engage clutch arm 174 and disengage the same from clutch disk 170.

When any one of the keys except the ones specified as special keys are depressed it therefore trips the mechanism just described and releases the lower end of lever 208 and allows the compression spring 175 to push the clutch arm against the clutch disk and the clutch arm and also cam 177 and then make one complete revolution, and all cams on shaft 172 make a complete revolution. A tension spring 211 returns the vertically disposed lever 208 to original position and causes it to be engaged by the latch 207 so that when shaft 172 makes a complete revolution, the clutch arm will be thrown away from the clutch disk so that it is impossible to have more than one complete revolution of shaft 172 from the depression of one key bar.

Fixedly mounted on shaft 172 and alongside cam 177 is a cam 225 (see Fig. 31) which operates upon a roller 226 mounted in one end of a bell crank lever 227. Bell crank lever 227 has a downwardly extending portion 228 in which portion a dog 229 is pivotally mounted as at 230 and a stud bolt 231 is secured in the downwardly projecting portion and penetrates loosely dog 229 and extends some distance beyond the outer surface of this dog and has mounted therearound a compression spring 232 which has a nut 233 on the end thereof to allow resiliency to said dog.

Dog 229 is adapted to engage a lever 234 which is fixedly secured on a squared shaft 235, which squared shaft is mounted for oscillatory movement in strips 25 and 26 (see Fig. 2).

Slidably mounted on oscillatory shaft 235 is a member 236 which has a downwardly projecting portion 237 said member 236 being slidably secured on squared shaft 235 by means of a plate 238 being secured thereto in any suitable manner. Secured onto plate 238 in any suitable manner is a projection 239 (see Fig. 2). On plate 238 is secured one end of a tension spring 240 and the other end of this tension spring extends backwardly and is secured to a pin 241 in strip 26.

An arm 242 (see Fig. 4) is secured on shaft 243 which is mounted in suitable bearings which penetrate bar 12 and extends across beneath the typewriter and is also mounted in bar 11 at the other end thereof. On the remote end of shaft 243 is an upwardly projecting arm 245 which has one end of a tension spring 246 secured thereto and the other end of this tension spring 246 is secured to a pin in bar 11. Secured to shaft 243 close to bar 12 and on the inside surface thereof is an arm 247 which has a screw 248 in the free end thereof which pierces a slot 249 in a link 250, the upper end of said link being secured to the normal shift key 262 of the typewriter which is operated in this embodiment of the invention for printing numerals and the like on the control sheet.

Shaft 243 has secured thereon close to arm 247 another arm 252 (see Figs. 4 and 6) which normally rests on a latch 253 fixed on a tube 254 and on this tube is also fixed an arm 255 which projects beneath and in alinement with another shift key bar 257 for causing capital letter cell control code characteristics to be printed on the control sheet so that when the particular shift key 259 is depressed, it will operate the above described mechanism. Tube 254 is mounted for oscillation on a pin 258 which is fixed in bar 12 with a nut on the end thereof for confining it in position in a loose manner. Latch 253 has a downwardly projecting lug 260 in which one end of a tension spring 261 is secured, and the other end of the tension spring is secured to bar 12 as shown in Figure 6.

Figure 6:
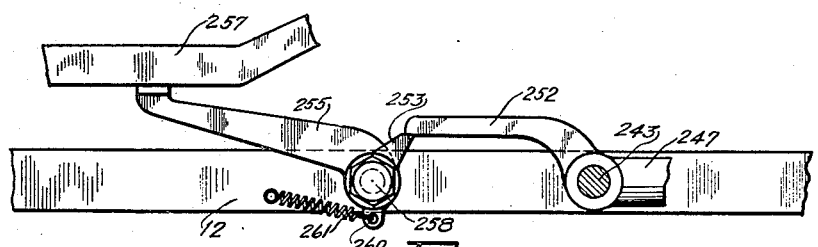
Figure 6 is a detail associated with the shift key bar for shifting to capital letter measurement.

As shown in Figure 6 the mechanism is in position for regular printing of lower case characters which is the normal position, and when the shift key 262 is depressed and member 236 will be slid all the way back to the left in Figure 2 by spring 240 to occupy a position for the printing of figures; whereas, when the parts are occupying the normal position as shown in Figure 6 for regular lower case letters, and it is desired to shift to the printing of capital letters, then shift key 259 is touched by the operator and member 253 is raised and arm 252 is allowed to fall downwardly and then plate member 236 is pushed by rod 263 operated from tension of spring 246, all the way to the right in Figure 2 and occupies a position for measuring capital letters which are indicated on the control sheet.

Pivotally secured on the upper end of lever 242 is a rod 263 which has adjustably mounted thereon a dog 264 which is adapted to engage projection 239 on plate 238 to move this plate to the right in Figure 2 along the squared shaft 235 for shifting to the various positions for operation of the longitudinal measuring bars. Rod 263 penetrates strip 25 for support purposes and is slidably mounted therein. The rod 263 moves plate 236 in one direction and spring 240 returns it to the left in Figure 2.

It is evident that the normal position of plate 236 is central of squared shaft 235, but it is evident that some means must be employed for holding member 236 when it is shifted all the way to the right in Figure 2 for measuring capital letter characters, and it will be observed that a bar 265 is secured to the lower ends of strips 25 and 26 and a leaf spring 266 is secured as at 267 to this bar and said bar has a hole therein thru which the free end of leaf spring 266 projects into the path of downwardly projecting portion 237 of member 236 and therefore holds it in its advanced position for the measuring of capital letter characters, as will be later described.

When member 236 is to be returned to normal position it swings inwardly in the measuring operation and moves back to normal position moving around the end of leaf spring 266.

Downwardly projecting portion 237 has a beveled surface 268 thereon which engages the free end of leaf spring 266 to allow the portion 237 to pass by the leaf spring as the member 236 is shifted to capital measuring position.

Fixedly secured on the end of transverse shaft 243 is an arm 269 which cooperates with the means for pulling the measuring tape and for returning the plate 236 to normal position as will be presently described.

Secured on shaft 172 (see Figs. 1 and 37) is a cam 275 and alongside this is another cam 276 for operating the grippers for gripping the measuring tape as will be presently described. Cam 276 has eccentrically mounted thereon as at 277 the upper end of an adjustable link 278 and the lower end of this link is secured to the free end of an arm 279 pivotally secured at its other end as at 280.

By referring to Figures 8 and 26 to 29 inclusive it will be seen that a plate 300 is secured to plate 15 at its lower end and to one of the corner posts of the typewriter at the upper and this plate has spaced projections 301 and 302; also 304 and 305, and near the lower end thereof a block 306 having a vertical slot 307 across which is secured a plate member 308 and these are all secured together and to the plate 300 by means of suitable screws 309.

By referring to Figures 26 and 27 it will be seen that slidable member 311 is placed between projections 304 and 305, and this member 311 has spaced projections 312 and 313 having suitable holes 314 and 315 therethru.

Member 311 has lugs 316 and 317 therein having suitable cavities in the outer surface thereof in which one end of compression springs 318 and 319 rest. The lower end of member 311 is diminished as at 320 which fits in slot 307 in block 306. Member 311 has a pin 321 therein (see Fig. 37) on which the upper end of tension spring 322 is secured, and the lower end of this tension spring is secured to pin 323 in block 306, the purpose of this tension spring being to normally pull member 311 downwardly at all times in the measuring operation and pulling of the tape for indicating purposes in the indicating device.

Member 311 has a rigid arm 324 extending outwardly therefrom and in the free end of this there is pivotally mounted the upper end of a link 325 adjustable as to length and the lower end of this link is pivoted as at 326 in lever 327 extending from and fixedly secured to the end of squared shaft 235.

A lower gripper member 330 is adapted to be secured between projections 312 and 313 and a suitable pin 331 is passed thru holes 314 and 315 and also hole 332 in the upper end of member 330 for pivotally securing member 330 between spaced projections 312 and 313.

This member 330 has an inwardly extending lip 333 at the upper inner surface thereof for gripping the indicator tape for pulling the same for indicating the amount of space occupied by a particular character in regular line printing.

Member 330 has outwardly projecting portions 334 and 335 having cavities on the inner surface thereof adapted to align themselves with cavities in members 316 and 317 to accommodate the other end of compression springs 318 and 319. The lower end of member 330 is adapted to be acted upon by cam 276.

Pivotally secured between projections 301 and 302 is member 340 which is pivoted by means of a pin 341 penetrating holes 342 in members 301 and 302, also penetrating a hole 343 in member 340. This member 340 has a lip 344 on the inner surface thereof adapted to grip the measuring tape while the members 311 and 330 are moving upwardly on the measuring tape to secure a grip thereon for the measuring operation when the measuring takes place in the measuring mechanism beneath the typewriter as will be presently described.

Member 340 extends downwardly and has a roller 345 (see Figs. 2, 28 and 37) on the lower end thereof adapted to follow cam 275. Member 340 has extending laterally therefrom a pin 350 which extends into a slot 351 in link 352 which link at its other end is pivotally connected as at 353 to the upper end of a lever 354 which is fixedly secured on shaft 355 which extends backwardly in the typewriter and is mounted in a bearing member 356 at one end and mounted in plate 104 at the other end, and near plate 104 is an upwardly projecting arm 357 which has a laterally projecting portion 358 (see Fig. 8) and an inwardly projecting portion 359 lying within the path of lever 102 which operates the moving of the platen to new line position, which operates to release the measuring tape when a new line position is shifted and causes the tape to return to normal position in the indicating mechanism as will be presently described.

Member 340 has also a pin 360 therein having one end of a tension spring 361 secured thereto and the other end of this tension spring is secured to lug 305 the purpose of this being to cause the roller 345 to follow cam 275 at all times.

With the parts in position as described strips 363 are to be secured respectively to lugs 302 and 305 on one side and to lugs 301 and 304 on the other side to hold the parts in assembled position.

Adapted to pass between lip 344 and the base of the space formed between projections 301 and 302 and then downwardly between lip 333 and base of the cavity formed between projections 312 and 313 and then passing down between members 330 and 311, also thru slot 365 in plate 308, is a metallic tape member 366, which has an enlargement 367 on the lower end thereof which limits the upward movement of the enlargement and the tape to cause the enlargement to rest against the lower portion of plate 308. This tape, after passing between the above mentioned parts, passes out of the upper end of the previously described mechanism and passes over a curved surface 378 into the indicating mechanism. Secured on top of the typewriter frame and near the front thereof are angular members 375 and 376 to which is secured a vertically disposed bar 377 and near the right hand end thereof as seen in Figures 1 and 33 is secured a member 378 having a curved surface over which the metallic tape 366 passes. Intermediate the ends of member 377 is a member 379 having a groove 380 cut therein and along which the metallic tape is supported. At the left hand end of Figure 33 there is a tension mechanism, as disclosed in Figure 36, which comprises a bracket member 381 riveted to member 377, and having a hole 382 therein thru which a stud bolt 383 is secured, and on this stud bolt is mounted a coiled leaf spring 384 by being secured to pin 385 at one end and the other end being secured to pin 386 which penetrates hole 387 in the end of the spring, this being mounted within a shell 388 having a grooved surface on the outer surface thereof around which is wound a suitable cord 390 having one end thereof fastened to the shell member and the other end thereof fastened to the metallic tape 366 as at 391. Shell 388 has a cover plate 389. This tape has pointer finger 392 thereon which projects upwardly into an indicating device designated broadly by reference character 393. The purpose of this arrangement is to normally pull the tape to cause the indicator finger 392 to occupy a zero position along the indicator board which will be presently described.

Covering the above described mechanism is an angular plate member 394 secured to bar 377 by means of suitable screws 395 which member 394 has an upwardly projecting portion 396 having a window therein and behind which window is inserted a chart 397 having measurements thereon designated by reference character 398 for indicating the "ems" in regular line printing and this chart also has indications designated by reference character 399 marked off in such a manner as to indicate for each marking the expansibility of a space band, and the operator by counting the number of spaces in the line up to a given point can determine from this chart the expansibility of the space bands in the line and the amount of space they can be expanded to occupy.

The chart is printed on or suitably fixed to member 400, and a slidable member 401 is mounted on member 400 and can be adjusted in position by means of a set screw 402, and this member has a pointer 403 extending downwardly in front of the chart so that the operator can adjust the length of regular line printing used by his particular newspaper or for this particular job for which he is making the control sheet.

Disposed below each of the bars 11 and 12 is a portion of the measuring apparatus for the width of characters which comprises spacer blocks 410 (see Figs. 4, 12 to 19, and 31) to which is secured a member 411 having longitudinal and transverse channels therein and a plate member 412 is secured to the lower side of this member 411. Members 410, 411 and 412 are secured to bars 11 and 12 by any suitable means such as screws 413. By the term longitudinal is meant running longitudinally of the member 11 or transversely of the typewriter and beneath the same. Member 411 has six longitudinal grooves spaced apart from each other therein, said grooves being indicated by reference characters 415, 416, 417, 418, 419 and 420. Member 411 also has a plurality of transverse grooves indicated by reference character 421, these transverse grooves being disposed all the way across beneath the typewriter, there being a groove 421 for each of the key bars and in these transverse grooves are mounted in pairs a plurality of slidable members 422, and 423.

The transverse bars are in pairs and bar 422 has downwardly projecting lugs 422a, 422b and 422c and its companion bar 423 has downwardly projecting portions 423a, 423b, and 423c. Bar 423 has similar lips 423d and 423e, the purpose of these lips being to hold the transverse bars in position and to limit the movement of said bars in both directions.

Associated with the front end of each of said transverse bars is a spring 424 which normally presses the transverse bars toward the rear of the typewriter as seen in Figure 12, and associated with the other end of each of said transverse bars and adapted to engage the end of said bars at all times for holding the same in normal position, is the lower end 425 of bell crank lever pivoted as at 426, said pivot 426 being in the form of a transversely disposed shaft 426 disposed between members 11 and 12 and on which the bell crank levers are mounted for oscillation. The other end of said bell crank levers is indicated by 427 and has connected to the end thereof links 428, the upper end of each of said links being pivotally connected to one of the key bars 189. A comb 430 is secured along the top of member 411 for properly spacing and holding in proper position the leg 425 of each of the bell crank levers.

There is a transverse bar 422 and 423 as the case may be for each of the conventional key bars in the typewriter and also for the spacer mechanism for the purpose of measuring each character printed by each key bar and also for measuring the space bands placed in the line. The transverse bars are in pairs which have just been described as bars 422 and 423. For example, let us suppose that bar 423 represents the letter Q, and bar 422 represents the letter A in a typewriter, these being key bars located beside each other in the typewriter and the arrangement in pairs is provided in order to economize in space to prevent the measuring slots from being wider than the space between the key bars in the typewriter to which it is attached.

Slidably mounted in the two longitudinal slots 415 and 416 is a pair of longitudinally disposed measuring bars 435 and 436 respectively, which bars have shoulders 435a and 436a on the lower end portions thereof, these ends of the bars (see Fig. 19) are disposed next to the right hand side of Figure 4 and are engaged by member 237 (see Fig. 31) as well as the other pairs of bars, which will be presently described, to accomplish the measuring operation.

The bar 435 has notches 435b which vary in width according to the particular character to be measured by the measuring mechanism, as these notches 435b are cut of proper width to indicate the width the particular character will occupy in regular line printing. The width of notches in the longitudinal bars vary to allow said bars to move a predetermined distance for the character represented by the notch.

In Figure 19, another notch 435b is shown which is adapted to cooperate with one of another pair of transverse bars which is not shown in Figure 19, but this bar and all of the other bars have similar notches arranged along their entire length for the measuring operation as will be seen in Figure 18 which is a bottom plan view of a portion of the longitudinal and transverse bars. Bar 436 has a notch 436b which is adapted to cooperate with transverse bar 422 to measure the character associated with said transverse bar whereas transverse bar 423 cooperates by means of its downwardly projecting portion 423a to measure in association with longitudinal bar 435 the character represented and associated with the key bar connected therewith. Bar 422 has a downwardly projecting portion 422a which is adapted to cooperate with notch 436b to measure the character represented by the key bar associated with said transverse bar 422.

The bars 435 and 436 are associated with the measuring of numeral characters when the key 262 (see Fig. 2) is depressed to cause member 237 to move forwardly toward the operator on squared shaft 235.

The two centrally disposed slots 417 and 418 have slidably mounted therein longitudinal bars 437 and 438 which have shoulders 437a and 438a to limit the outward movement of said bars toward member 237 of the measuring apparatus and bar 437 has a plurality of notches such as 437b therein, these notches being disposed throughout the length of said rods and being on the upper side thereof and are adapted to cooperate with projection 423b on transverse member 423 to measure the character or key bar associated with said transverse bar. The second occurring notch 437b as seen in Figure 19 is adapted to cooperate with the first of another pair of transverse bars not shown in this figure, but in Figure 18 a plurality of such bars are shown. The width of all of the notches shown in the longitudinal bars varies to agree with the particular character to be measured thereby in the measuring apparatus. These longitudinal bars 437 and 438 are used to measure lower case characters in regular line printing.

Slidably mounted in longitudinal slots 419 and 420 are the longitudinally disposed bars 439 and 440 having shoulders 439a and 440a thereon to limit their outward movement toward member 237, and member 439 has notches 439b therein adapted to cooperate with projection 423c and bar 440 has a plurality of notches 440b therein adapted to cooperate with projection 422c on bar 422 in the measuring operation which has been described. These bars measure higher case characters.

The shoulders such as 435a, 436a at the end of each of the longitudinal bars as shown in Figure 19 are adapted to normally fit against a plate member 445 secured on the end of member 411 which is next to member 237 to limit the movement of the longitudinal bars outward toward member 237.

By referring to Figures 1 and 15, means are shown whereby longitudinal bars are normally pressed toward member 237 and against plate member 445. Here is shown a plate 446 having projections at the upper end thereof in which is mounted a pin 447 to which is pivotally secured a plate member 448 which projects downwardly and is restricted in width at its lower end and is adapted to be engaged by a pivoted dog 449 pivoted to the bar 411.

This plate member 448 has a plurality of leaf springs 450 secured thereon, the lower end of each of said leaf springs being adapted to press against the opposite end of longitudinal bars from that shown in Figure 19 to normally press the longitudinal bars 435 to 440 inclusive towards plate 445, and when the measuring apparatus operates to move a pair of the longitudinal bars against leaf springs 450, the leaf springs will return the longitudinal bars to normal position after the measuring operation for a particular character has been completed.

Plate member 450 has projections 452 on each side thereof which fit against plate 446 to limit the inward movement of the pivoted plate.

It is seen that the longitudinal bars move in pairs and that when a particular key bar is depressed, one of the cross bars 423, for example, will be moved to cause projection 423a to pass into slot 435b, but the bar 422 will not be moved at all and therefore its projection 422a will not move into slot 436b, and then when member 237 in the measuring operation moves these two longitudinal bars it is seen that the notch 435b will be of such a length as to allow 435 to move a predetermined distance it will regulate the distance the indicator tape is pulled downward by the gripping mechanism, already described, and thus the measurement of this particular character will be taken to indicate the amount of space said character will occupy in a line of regular line printing.

The above described measuring operation and operation of bars 435 and 436 takes place when shift gear key 262 is depressed and a similar operation will take place when lower case measuring takes place on the two centrally disposed longitudinal bars and also when the high case measuring is effected as all of this is determined upon the position of member 237 along squared shaft 235.

It is evident, therefore, that in case of adjusting this typewriter for preparing a control sheet for a line casting machine having broader type that any conventional set of longitudinal bars 435 to 440 inclusive may be removed instantly from the member 411 by swinging plate 448 upwardly and a new set of longitudinal bars can be inserted into the mechanism having slots cut of a greater or smaller width, if desired, to properly measure and indicate the space occupied by a larger or smaller set of characters in regular line printing.

In Figures 43, 44 and 45 is shown a slightly modified form of the invention wherein the key bars will be depressed, but motor power will be used for operating the type bars. In this modified form the conventional key bars as indicated by reference character 460 having bell cranks extending downwardly therefrom indicated by 461 of different lengths to engage the T-shaped portion 426 of the transverse sliding measuring bars 463 which cooperates with the longitudinal bars 435 to 440, previously described, mounted in the casing 464 and projecting from the rear sides thereof where these transverse bars each engage a dog 465 pivoted as at 466 to key bar operating means 467 which cooperates with bell crank lever 468 for operating the type bars 469.

The dogs 465 are held in normal position by a tension spring for each dog indicated by 470 held at the other end on a pin 471 secured in housing 464. An oscillating rod or shaft 473 is mounted in the typewriter and extends transversely thereacross and has arms 474 having a transverse bar 475 secured on the ends thereof which bar 475 is adapted to engage any dogs 465 which may be pushed into its path by the depression of a key bar and this bar 475 is oscillated by means of a connecting rod 476 secured thereto and having its other end secured as at 478 to an arm 479 fixedly secured on a shaft 480.

Shaft 480 has an arm 481 secured thereon which is pivotally secured to a transverse bar 482 which bar displaces bar 184 as shown in Figures 30 and 31, and the outer end of this bar is pivotally secured to the lower end of lever 179 at the same point where bar 184 is shown in Figure 31 as being secured.

A transverse shaft 485 is mounted in the typewriter and is adapted to have one end thereof secured to one end of link 203 instead of one end being secured to lever 202 so that when a key is depressed, shaft 485 will be moved backwardly in the typewriter and will release the latch member 208 and release clutch arm 174 and allow the clutch to engage to cause cam 177 which may be modified as to contour to move bar 482 transversely to automatically pull down oscillating bar 475 to engage the dog 465 pushed inwardly by the depression of a particular key bar and this will cause the type bar to be automatically operated by the machine itself instead of by manual pressure.

When transverse bar 463 is moved against its associated dog 465, a notch 463a in the lower edge thereof will engage the dog 485 which dog 485 extends all the way across beneath all of the transverse bars 463 and when any one of the bars 463 is moved in against dog 465 a notch 463a will engage the elongated dog 485 to hold the same in position, but when member 475 is moved downwardly it will engage a set screw 486 in arm 487 fixed onto shaft 488 to which is secured pawl 485 and will release the pawl 485 from the notch 463a and allow the transverse bar 463 to move backwardly to normal position as shown in Figure 43 under pressure of spring 470.

Fixedly secured on shaft 488 is a lever 490 which at its upper end has a tension spring 491 secured to housing 464 which serves to cause elongated dog 485 to engage notches 463a in the lower surface of all of the transverse bars 463.

While using mechanical operation as shown in Figures 43 to 45 inclusive it eliminates the personal touch of individual operators on the key bars and causes a uniform intensity of printing of the legible characters and cell controls associated therewith on the control sheet.

In Figure 46 is shown a legible character and the cell controls therebelow with certain of the cell controls being darkened to indicate the letter T, which of course is a lower case cell control as if it should be desired to have higher case letter printed then a higher case cell control would be placed immediately in front of the cell controls for this character on the control sheet. The cell control in itself is indicated broadly by reference character 500 and is divided into six sections, each indicated by reference characters 501, 502, 503, 504, 505 and 506, and it is seen that each one of these sections is adapted to be scanned by a photo-electric cell as set forth in my above referred to co-pending patent applications and it is seen that sections 502 and 503 will be darkened to indicate the letter t and it is thru a combination of causing certain of these sections to be shaded to work out a combination for each character in regular line printing to cause the typesetting machine to be automatically operated by a successive scanning of the cell controls on the control sheet.

In Figure 47, I have shown the characters and their associated cell controls as printed by the type bars in the typewriter, the cross hatching indicating solid black.

Figure 5:
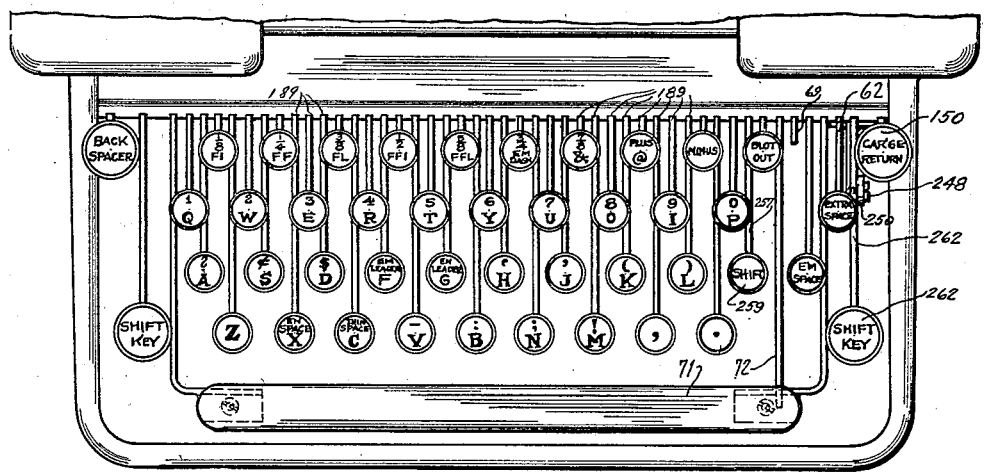
Figure 5 is a top plan view of the key board.

In ordinary typing without either of shift button 259 or shift button 262 being depressed, the printing of lower case characters will take place which will be the character represented in the lower space in each of the key buttons as shown in Figure 5, but when the button 262 is depressed the upper characters appearing on the key buttons in Figure 5 will be printed with their cell controls and of course when a capital letter notation is desired the button 259 will be depressed to print the shift character appearing first in the last line of Figure 47.

In the drawings and specification, there has been set forth a preferred embodiment of the invention and although specific terms are employed, they are used in a generic and descriptive sense only and not for purposes of limitation, the scope of the invention being set forth in the appended claims.

I claim:

1. In a typewriter having type bars and a platen and a ribbon, projections on the type bars for printing cell controls, means operable by the type bars for measuring the space occupied in regular line printing by a character represented by each of said cell controls, said measuring means comprising a bar for each key bar and operable by the key bar when depressed in a line transversely of the platen of the typewriter, a plurality of bars slidable longitudinally with relation to the platen of the typewriter, indicating means controlled by the said longitudinally movable bars for indicating the space occupied by a particular character in regular line printing.

2. Means for preparing a light sensitive cell control sheet comprising a typewriter having key bars, type bars, a ribbon, and a platen adapted to receive the control sheet therein, means operable by the depression of a key bar and bodily movable laterally of the key bar for measuring the space occupied by the character represented by said key bar in regular line printing, means for indicating said measurement, said indicating means comprising a relatively light weight flexible member positively movable step by step in a straight line by said measuring means.

3. Means for preparing a control sheet comprising a typewriter having key bars, type bars, and a platen for receiving the control sheet, a slidable bar for each key bar and operable thereby, a plurality of bars slidable transversely of the first bar and adapted to engage the first bars to measure the space occupied by the characters represented by the key bars in regular line printing, there being separate transversely slidable bars for higher case, lower case, and numeral characters, indicating means controlled by all of said measuring means, the indicating means serving to indicate measurement of the characters.

4. Means for preparing a control sheet comprising a typewriter having a plurality of bars movable transversely of the typewriter platen, there being a bar for each key bar and operable thereby, said bars having a plurality of other slidable bars movable longitudinally with relation to the platen, both of said sets of bars having notches and projections cooperating with each other to measure the space occupied by the characters in regular line printing, an indicator member movable in a straight line for indicating said measurements, there being separate bars movable longitudinally with relation to the platen on the typewriter for separate cases of characters.

5. In a typewriter for preparing a control sheet for light sensitive cell mechanisms comprising a plurality of individually operable type bars, a slidable bar movable by the depression of the operating means for each of the type bars, other bars movable transversely of the axes of the first bars, the two sets of bars having notches and projections thereon, cooperating to allow movement of a definite amount of the second bars when a particular key bar is depressed to operate a particular type bar and the slidable bar associated therewith, a flexible tape member movable transversely of the machine and means for moving said tape member, connections between said moving means and the second set of bars for moving the tape a limited amount by movement being imparted to the second set of bars to indicate the amount of space occupied by a particular character in regular line printing.

6. Means for measuring the space occupied by characters in regular line printing comprising a typewriter for printing the characters on a suitable control sheet, said measuring means comprising a plurality of bars, resilient means normally forcing said bars in one direction, a plurality of other bars mounted transversely of the first bars and being operable by the depression of the key bars in the typewriter to allow sliding movement of the first bars, measuring means associated with one end of said first bars adapted to move an indicating device, said indicating device comprising a relatively light tape member having indicating means thereon and gripping members adapted to selectively engage and advance said tape a distance corresponding to the distance the first bars move in the typewriter.

7. In a typewriter for preparing a control sheet for light sensitive mechanisms comprising a plurality of type bars for printing the characters, a plurality of key bars for operation of the type bars, a slidable bar operable by each key bar, a plurality of other slidable bars disposed transversely of the first bars, said two sets of bars having projections and notches thereon limiting movement of the second bars, resilient means normally pressing the second bars in one direction, resilient means for pressing the second bars in the other direction, positively driven means associated with the typewriter for moving said second bars in the other direction, the projections and notches determining the amount of movement imparted to the second bars, a movable member associated with the typewriter and having an indicating device thereon, means connected with said positively driven means for advancing said movable indicating member in proportion to the amount the said second bars are moved.

8. Means for measuring the space occupied by the characters in regular line printing comprising a typewriter having key bars and type bars operated thereby, a slidable bar movable by said key bars when the same are depressed, there being a slidable bar for each key bar, a plurality of elongated bars disposed beneath the typewriter and movable transversely of the first bars, the two sets of bars having notches and projections thereon cooperating together to allow movement of the elongated bars a predetermined amount for each depressed key bar, measuring means controlled by the elongated bars, and an indicating device on said measuring means for indicating the amount of space occupied by a particular character in regular line printing.

9. In an indicating device adapted to be associated with a typewriter for indicating the amount of space occupied by a particular character in regular line printing, said indicating device comprising a relatively long and narrow tape of light weight and having an indicating member thereon, a fixed chart cooperating with said indicator finger to indicate the amount of space occupied by a particular character in regular line printing, means bodily movable laterally of the key bars and controlled by the key bars for measuring the amount of space occupied by the characters in regular line printing, means controlled by the measuring means for imparting positive movement to said tape when a particular key bar is depressed, and means for holding said tape in position while another key bar is being operated to again move the tape.

10. In a typewriter, means for measuring the space occupied by a character in regular line printing, comprising a slidable bar for each key bar and movable thereby when said key bar is depressed, a plurality of elongated bars movable transversely of the first bars, means for normally forcing said elongated bars in one direction to cause the same to assume a normal position, a positively driven member connected to one side of the typewriter and being adapted to force said elongated bars in one direction out of their normal position, all of said bars having notches and projections thereon adapted to determine the amount of movement imparted to the elongated bars for a particular character, indicating means on said typewriter and movable transversely thereof, the movement imparted to the indicating means being determined by the amount of movement allowed to the elongated bars.

11. Means for measuring the amount of space a character will occupy in regular line printing comprising a typewriter, a measuring device connected to said typewriter, said measuring device comprising a bar for each key in the typewriter and movable when a key is depressed, a plurality of elongated bars, a portion of the elongated bars occupying the same horizontal plane as the first bars, means for normally pressing said elongated bars in one direction, positively driven means secured to the typewriter for moving said elongated bars in another direction, indicating means, positively driven means for moving said indicating means, the amount of movement imparted to said indicating means being controlled by the amount of movement allowed to be imparted to the elongated bars by the said bars associated with the keys in the typewriter.

12. Means for measuring the amount of space occupied by a character in regular line printing comprising a typewriter, a slidable bar for each key bar in the typewriter and movable by a depression of a key bar, a plurality of elongated bars mounted transversely of said first bars, the first bars having projections extending downwardly therefrom, the elongated bars having notches of predetermined width, there being a notch for each character desired to be measured, resilient means for normally pressing said elongated bars in one direction, positively driven means mounted on the typewriter for moving said elongated bars against said resilient means as far as the projections on said first bars will permit when said first bars are operated by the key bars, indicating means for indicating the amount of movement allowed the elongated bars, the elongated bars comprising a plurality of sets of bars, one set being adapted to measure lower case characters, another set being adapted to measure higher case characters, and still another set being adapted to measure numerals and the like, and means for selectively engaging said sets of bars to measure the said characters.

13. In a typewriter having conventional key bars and type bars with said type bars having also means thereon for printing cell controls, measuring means comprising a bar for each of the key bars and movable thereby, a plurality of elongated bars movable transversely of the first bars, both the bars associated with the key bars and the elongated bars having cooperating projections and notches therein, means for normally holding the elongated bars in one position, positively driven means for moving said elongated bars in another direction, the movement of said elongated bars being controlled by the bars associated with the key bars, the movement of said bars being such as to measure the space occupied by a particular character in regular line printing and indicating means operable by said measuring means.

14. In a typewriter, means for measuring the amount of space occupied by a character written by the typewriter in regular line printing, said measuring means comprising a bar associated with each key bar in the typewriter and movable thereby, a plurality of elongated bars movable with relation to the first bars, means on all of said bars limiting the amount of movement which may be imparted to the elongated bars, measuring means operable by the movement of the elongated bars comprising a constantly driven shaft, a second shaft adapted to be engaged with the constantly driven shaft when a character is printed by the typewriter, means operable by the second shaft for moving the elongated bars as far as the bars associated with the key bars will permit, indicating means operable by said second shaft, said indicating means comprising a tape having an indicator finger thereon and movable with relation to the typewriter, said means for moving said tape comprising two sets of grippers intermittently operated by said second shaft to grip the tape and to move it, said movement of the tape being determined by the movement allowed to said elongated bars.

15. In a typewriter for preparing a control sheet, said typewriter having key bars and type bars and a platen for receiving the control sheet, a plurality of elongated bars movable transversely of the typewriter, a relatively short bar associated with and movable by the key bars when the same are depressed in the writing operation, means on all of said bars for allowing a predetermined amount of movement of the elongated bars to measure the amount of space occupied by a particular character in regular line printing, indicating means on said typewriter, and means governed by the movement of said elongated bars for moving said indicating means.

16. In a typewriter for preparing a control sheet for controlling light sensitive cell mechanisms, a plurality of sets of elongated bars mounted beneath the typewriter and slidable with relation to the typewriter, a relatively short bar movable by depression of each key bar, there being a short bar for each key bar in the typewriter, means for normally pressing said elongated bars in one direction, means on said short bars and elongated bars for allowing a predetermined amount of movement to the elongated bars for each character in regular line printing, indicating means controlled by the movement of said elongated bars for indicating the amount of space occupied by a character in regular line printing.

17. Means on a typewriter and operable by the keys of the typewriter for measuring the amount of space occupied by the character printed by the typewriter in regular line printing, said measuring means comprising a bar associated with each key bar in the typewriter and movable by the depression of each key bar, a plurality of transversely movable bars mounted beneath the typewriter and controlled in their movements by the said bars associated with the key bars, indicating means, a positively driven shaft secured to the typewriter, means adapted to be connected to said positively driven shaft by a depression of a key in the typewriter for measuring the amount of movement allowed to the longitudinal bars by a bar associated with a particular key bar and indicating means movable by said measuring means.

18. In a typewriter having conventional key bars and type bars, measuring means comprising a bar for each of the key bars and movable thereby, a plurality of elongated bars movable transversely of the first bars, both the bars associated with the key bars and the elongated bars having cooperating projections and notches therein, means for normally holding the elongated bars in one position, positively driven means for moving said elongated bars in another direction, the movement of said elongated bars being controlled by the bars associated with the key bars, the movement of said bars being such as to measure the space occupied by a particular character in regular line printing and indicating means operable by said measuring means.

19. In a typewriter having type bars and key bars for printing light sensitive cell control characters on a control sheet, means operable by the key bars for measuring the amount of space a character will occupy in regular line printing and a type bar actuated by the spacing mechanism for writing a spacing character on the control sheet between a pair of words at each operation of the spacing mechanism.

20. In a typewriter having key bars and type bars for writing characters and a carriage having a carriage return mechanism, a spacing mechanism, a type bar actuated by the spacing mechanism for writing a spacing character at each operation of the spacing mechanism, means operable by the key bars and spacing mechanism for measuring the amount of space a character written will occupy in regular line printing, and means adapted to be optionally connected to the carriage return mechanism for printing an extra spacing character when the carriage is returned to initial position.

21. In a typewriter, a plurality of members movable with relation to the typewriter, mechanism for indicating the amount of space a character written by the typewriter will occupy in regular line printing, means for moving the said mechanism and means controlled by the operation of writing a character for allowing movement of one of said movable members a predetermined amount by the means for moving the indicating mechanism.

22. In a typewriter, a plurality of members movable with relation to the typewriter, mechanism for indicating the amount of space a character written by the typewriter will occupy in regular line printing, means for moving the said indicating mechanism, means controlled by the operation of writing a character for allowing movement of one of said movable members a predetermined amount by the means of moving the indicating mechanism and means for shifting the said means for moving said indicating mechanism to cause it to selectively engage said members movable with relation to the typewriter.

23. In a typewriter having a plurality of key bars for operating a plurality of type bars, means operable when a key bar is operated for measuring the amount of space the character represented by said key bar will occupy in regular line printing and means operable by the measuring means for locking at least some of the key bars against operation for a predetermined time after the operation of a key bar.

24. In a typewriter having a plurality of key bars for operating a plurality of type bars, a source of energy, solely mechanical means for measuring the amount of space a character written by the typewriter will occupy in regular line printing, indicating means controlled by the measuring means and other solely mechanical means controlled by a key bar when depressed for connecting the indicating means to the source of energy for operation of the indicating means.

25. In a typewriter having a plurality of key bars for operating a plurality of type bars, a source of energy, solely mechanical means for measuring the amount of space a character written by the typewriter will occupy in regular line printing, indicating means controlled by the measuring means, other solely mechanical means controlled by a key bar when depressed for connecting the indicating means to the source of energy for operation of the indicating means and means removed from contact with the key bars for disconnecting the indicating means from the source of energy after indicating the space occupied by a character.

26. In a typewriter having key bars for operation of type bars for writing lower case characters, higher case characters and numerals, a plurality of separately movable means for measuring the amount of space said respective characters will occupy in regular line printing, means controlled by the measuring means for indicating measurements of amount of space and means for causing said indicating means to selectively engage one set at a time of said measuring means.

27. In a typewriter having type bars for writing characters and key bars for operating the same, means for measuring the amount of space written characters will occupy in regular line printing and means on the typewriter for indicating at any time the expansibility of the space bands in a line of type set from said characters.

28. In a typewriter having type bars and key bars for operating the same and a carriage mechanism therein supporting a rotatable platen, and means automatically operable upon return of the carriage for printing a spacing characteristic at the beginning of the line already written and before the platen is moved to new line position.

29. In a typewriter having type bars and key bars for actuating the type bars, solely mechanical means associated with the key bars for measuring the amount of space a character on an actuated type bar will occupy in regular line printing, other solely mechanical means controlled by said measuring means for indicating the measurement of the characters on actuated type bars, a constantly driven shaft, an intermittently driven shaft, means on the intermittently driven shaft for operating said indicating means, means controlled by the key bars for connecting said intermittently driven shaft to said constantly driven shaft and means for automatically disconnecting said intermittently driven shaft from said constantly driven shaft after said intermittently driven shaft makes one complete revolution.

30. In a typewriter having type bars and key bars for operating the type bars, an indicator for indicating the amount of space a character will occupy in regular line printing, means for moving the indicator, means for holding the indicator against movement, means for measuring the amount of space the characters written by the type bars will occupy in regular line printing, means controlled by the measuring means for operating the holding means to release the indicator to allow movement thereof, and means controlled by the measuring means for stopping movement of the indicator when the indicator has moved a distance proportional to the space the character on the operated type bar will occupy in regular line printing.

31. In a typewriter having type bars and key bars for operating the type bars, means for measuring the amount of space the characters on the type bars operated in the writing operation will occupy in regular line printing, means for indicating said measurements to the operator of the typewriter, driven means for operating the indicating means, and means movable by the driven means for preventing operation of all of the key bars until the indicating means have been operated.

32. In a typewriter having type bars and key bars for operating the type bars, solely mechanical means controlled by the key bars for measuring the amount of space a character controlled by the key bar will occupy in regular line printing, indicating means for indicating the measurements of the characters, means for moving the indicating means, a source of energy for driving the means for moving the indicating means and other solely mechanical means operable by the actuation of a key bar for connecting the means for moving said indicating means to said source of energy.

33. In a typewriter having type bars and key bars for operating the type bars, solely mechanical means controlled by the key bars for measuring the amount of space a character controlled by the key bar will occupy in regular line printing, indicating means for indicating the measurements of the characters, means for moving the indicating means, a source of energy for driving the means for moving the indicating means, other solely mechanical means operable by the actuation of a key bar for connecting the means for moving said indicating means to said source of energy and means for disconnecting said source of energy from the means for moving the indicating means after the indicating means have been moved.

34. In a typewriter having type bars and key bars for operating the type bars, indicating means controlled by actuation of the key bars for indicating the amount of space a character operated on an operated type bar will occupy in regular line printing, means normally tending to move said indicating means, means for holding the indicating means in stationary position, and means controlled by the actuation of a key bar for moving the holding means to release said indicating means to allow it to move a distance proportional to the width the character represented by said actuated key bar will occupy in regular line printing.

35. In a typewriter having type bars and key bars for operating the same, means controlled by the key bars for measuring the amount of space a character on an operated type bar will occupy in regular line printing, movable means adapted to engage the measuring means and to move the measuring means as far as permitted by the measuring means, an indicating device and connections between the indicating device and the movable means for moving the indicating device.

36. In a typewriter having type bars and key bars for operating the same, means controlled by the key bars for measuring the amount of space a character on an operated type bar will occupy in regular line printing, movable means adapted to engage the measuring means and to move the measuring means as far as permitted by the measuring means, an indicating device, connections between the indicating device and the movable means for moving the indicating device and means for holding the indicating device in moved position until again moved by the movable means.

37. In a typewriter having type bars and key bars for operating the type bars, means controlled by the key bars for measuring the amount of space a character represented by the actuated key bar will occupy in regular line printing, an indicating member, a chart associated with said indicating member, means for gripping the indicating member and moving it a distance proportional to the width of the character represented by the actuated key bar, other gripping means for gripping and holding the indicating member in its new position against movement in any direction until another key bar is actuated to cause said first gripping means to again grip and move the indicating means.

38. A typewriter having a plurality of key bars for operating a plurality of type bars, a constantly rotating motor, solely mechanical means for measuring the amount of space a character written by the typewriter will occupy in regular line printing, indicating means controlled by the measuring means, other solely mechanical means controlled by a key bar when depressed for connecting the indicating means to the motor for operation of the indicating means, and means for automatically disconnecting the indicating means from the motor when the indicator has been moved by the motor.

39. A typewriter having a plurality of type bars and a key bar for operating each type bar, an electric motor, a shaft constantly driven by the motor, means movable by the shaft for measuring the space occupied by each character on an operated type bar in regular line printing and means driven by said shaft for indicating the measurement taken by the measuring means.

40. A typewriter having a plurality of type bars and a key bar for operating each type bar, an electric motor, a shaft constantly driven by the motor, means movable by the shaft for measuring the space occupied by each character on an operated type bar in regular line printing, means driven by said shaft for indicating the measurement taken by the measuring means and means driven by said shaft for preventing operation of all of the type bars until said shaft has completed one revolution.

41. A typewriter having a plurality of type bars and a key bar for operating each type bar, an electric motor, a shaft constantly driven by the motor and a bar disposed below the key bars and movable vertically by said shaft upon actuation of a key bar for preventing operation of the key bars until said shaft has completed a revolution.

42. A typewriter having a plurality of type bars and a key bar for operating each type bar, an electric motor, a shaft constantly driven by the motor, means movable by the shaft for measuring the space occupied by each character on an operated type bar in regular line printing, means driven by said shaft for indicating the measurement taken by the measuring means and a bar disposed below the key bars and movable vertically by said shaft upon actuation of a key bar for preventing operation of the key bars until said shaft has completed a revolution.

43. A typewriter having a plurality of type bars and a key bar for operating each type bar, an electric motor, a shaft constantly driven by the motor, means movable by the shaft for measuring the space occupied by each character on an operated type bar in regular line printing, means driven by said shaft for indicating the measurement taken by the measuring means and means for preventing operation of the type bars until the measurement of an actuated type bar has been indicated by the indicating means.

44. A typewriter having a plurality of type bars and key bars for actuating said type bars and a plurality of separately movable notched bars associated with the key bars and movable transversely of the key bars upon actuation of a key bar for measuring the space occupied by the character represented by the actuated key bar.

45. A typewriter having a plurality of type bars and key bars for actuating said type bars, a plurality of separately movable notched bars associated with the key bars and movable transversely of the key bars upon actuation of a key bar for measuring the space occupied by the character represented by the actuated key bar and means for preventing operation of the type bars until the measurement of an actuated type bar has been indicated by the indicating means.

46. In a typewriter, a motor driven mechanism, a plurality of key bars, a plurality of type bars connected with said key bars for hand operation of said type bars, a plurality of separately movable bars movable by the said mechanism for measuring the space a character on an actuated type bar will occupy in regular line printing.

47. In a typewriter, a motor driven mechanism, a plurality of key bars, a plurality of type bars connected with said key bars for hand operation of said type bars, a plurality of separately movable bars movable by said mechanism for measuring the space a character on an actuated type bar will occupy in regular line printing and means movable by said mechanism for locking the key bars against actuation for a predetermined time after a key bar has been actuated.

48. In a typewriter, a motor driven mechanism, a plurality of key bars, a plurality of type bars connected with said key bars for hand operation of said type bars, a plurality of separately movable bars movable by said mechanism for measuring the space a character on an actuated type bar will occupy in regular line printing, means movable by said mechanism for locking the key bars against actuation for a predetermined time after a key bar has been actuated and means movable by said mechanism for indicating the measurements taken by the measuring means.

49. Means for preparing a control sheet including a typewriter having type bars and a platen, projections on the type bars for printing cell controls, means operable by the key bars for measuring the space occupied in regular line printing by a character represented by each of said cell controls, said measuring means comprising a set of bars, one for each key bar and operable by the key bar when depressed in a line transversely of the platen of the typewriter, a second set of bars slidable longitudinally with relation to the platen of the typewriter, indicating means controlled by the said longitudinally movable bars for indicating the space occupied by a particular character in regular line printing.

50. Means for preparing a control sheet comprising a typewriter having type bars and key bars and space measuring means, the space measuring means including a slidable bar for each key bar and operable thereby, a second set of bars slidable transversely of the first bars and adapted to engage the first bars to measure the space occupied by the characters represented by the key bars in regular line printing, there being separate transversely slidable bars for higher case, lower case, and numeral characters, indicating means controlled by all of said measuring means, the indicating means serving to indicate measurement of the characters.

51. Means for preparing a control sheet comprising a typewriter having type bars and key bars for operating the same, means for measuring the space an actuated type bar will occupy in regular line printing, the space measuring means including a plurality of bars movable transversely of the typewriter platen, there being a bar for each key bar and operable thereby, a second set of bars slidable longitudinally with relation to the platen, both of said sets of bars having notches and projections cooperating with each other to measure the space occupied by the characters in regular line printing, an indicator member movable in a straight line for indicating said measurements.

52. Means for preparing a control sheet, comprising a typewriter having a plurality of type bars and a key bar for actuating each type bar, a plurality of bars slidable transversely of the typewriter and having notches therein, a bar actuated by each key bar and movable transversely of the first slidable bars, means for forcing the first set of bars in one direction, and measuring means associated with one end of said first bars adapted to move an indicating device, the indicating device comprising a relatively light tape member having indicating means thereon and gripping members adapted to selectively engage and advance said tape a distance corresponding to the distance the first bars move in the typewriter.

53. Means for preparing a control sheet comprising a typewriter having a plurality of type bars for printing the characters, a plurality of key bars for operation of the type bars, a slidable bar operable by each key bar, a plurality of other bars disposed transversely of the slidable bars, said other bars and slidable bars having projections and notches thereon limiting movement of the second bars, resilient means normally pressing the second bars in one direction, resilient means for pressing the second bars in the other direction, positively driven means associated with the typewriter for moving said second bars in the other direction, the projections and notches determining the amount of movement imparted to the second bars, a movable member associated with the typewriter and having an indicating device thereon, means connected with said positively driven means for advancing said movable indicating member in proportion to the amount the said second bars are moved.

54. Means for preparing a control sheet, including a typewriter and means for measuring the amount of space occupied by a character in regular line printing comprising a slidable bar for each key bar in the typewriter and movable by a depression of a key bar, a plurality of elongated bars mounted transversely of said first bars, the first bars having projections extending downwardly therefrom, the elongated bars having notches of predetermined width, there being a notch for each character desired to be measured, resilient means for normally pressing said elongated bars in one direction, positively driven means mounted on the typewriter for moving said elongated bars against said resilient means as far as the projections on said first bars will permit when said first bars are operated by the key bars, indicating means for indicating the amount of movement allowed the elongated bars, the elongated bars comprising a plurality of sets of bars, one set being adapted to measure lower case characters, another set being adapted to measure higher case characters, and still another set being adapted to measure numerals and the like, and means for selectively engaging said sets of bars to measure the said characters.

55. Means for preparing a control sheet, comprising a typewriter, means for measuring the amount of space occupied by a character written by the typewriter in regular line printing, said measuring means comprising a bar associated with each key bar in the typewriter and movable thereby, a plurality of elongated bars movable with relation to the first bars, means on all of said bars limiting the amount of movement which may be imparted to the elongated bars, measuring means operable by the movement of the elongated bars comprising a constantly driven shaft, a second shaft adapted to be engaged with the constantly driven shaft when a character is printed by the typewriter, means operable by the second shaft for moving the elongated bars as far as the bars associated with the key bars will permit, indicating means operable by said second shaft, said indicating means comprising a tape having an indicator finger thereon and movable with relation to the typewriter, said means for moving said tape comprising two sets of grippers intermittently operated by said second shaft to grip the tape and to move it, said movement of the tape being determined by the movement allowed to said elongated bars.

56. In a typewriter, three sets of permutation bars for measuring the space the written characters in a line will occupy in regular line printing, said typewriter having means for writing high case, low case and numeral characters and there being a set of permutation bars for each of the two cases and the numerals, means normally holding the permutation bars for low case unlocked and the other two sets locked against operation, and means operable upon a shift operation for locking the permutation bars for the low case against operation and releasing the high case permutation bars for operation, and means operable by the permutation bars for collectively indicating the total space all of the written characters will occupy in regular line printing.

57. In a typewriter, type bars for printing, means for actuating said type bars one at a time, means controlled by actuation of a type bar and movable upon actuation of a type bar a distance which is proportional to the space the actuated character will occupy in regular line printing, indicating means comprising a tape, a roller on which one end of the tape is rolled, tension means for normally urging the roller and tape in one direction, a chart associated with said tape, a pointer on said tape for cooperation with said chart, means normally gripping the tape to restrain movement of the tape by said tension means, other means for occasionally gripping and moving the tape against the tension of said tension means, and means controlled by actuation of a type bar for gripping the tape with the other gripping means to move the same and also releasing the first gripping means while the tape is being moved.

58. Means for indicating the space an actuated character will occupy in regular line printing comprising a tape, a chart associated with said tape, a pointer mounted on said tape in cooperative relation to said chart, tension means normally urging the tape in one direction, means normally holding the tape against movement by said tension means, means controlled by an actuated character for gripping the tape, releasing the means normally holding the tape, and moving the tape in proportion to the width the actuated character will occupy in regular line printing.

59. In a typewriter having type bars with a character on each type bar, a chart having markings thereon indicating "em" measurements, other markings on the chart indicating expansibility of space bands, an indicator movable relative to said chart, means including a plurality of transversely movable permutation bars controlled by an actuated type bar for moving the indicator whereby an operator by observing the chart and indicator during the writing of a line of characters can determine the expansibility of the space bands in a line when the characters already in the line written are reproduced in a line-casting machine, type-setting machine and the like.

60. In a typewriter having type bars each provided with a character and means for actuating the type bars, means for indicating the space the character on an actuated type bar will occupy in regular line printing, and means controlled by the actuation of a type bar for gripping said indicator and moving the same.

BUFORD L. GREEN.